(12) United States Patent
Lipka et al.

(10) Patent No.: US 10,795,799 B2
(45) Date of Patent: Oct. 6, 2020

(54) WEBSITE DEBUGGER FOR NATURAL LANGUAGE TRANSLATION AND LOCALIZATION

(71) Applicant: salesforce.com, inc., San Francisco, CA (US)

(72) Inventors: Hendrik Lipka, Jena (DE); Benjamin Siegmund, Jena (DE); Cornelia Charlotte Sittel, Arlington, MA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/965,604

(22) Filed: Apr. 27, 2018

(65) Prior Publication Data

US 2018/0300218 A1 Oct. 18, 2018

Related U.S. Application Data

(63) Continuation-in-part of application No. 15/491,952, filed on Apr. 19, 2017, and a continuation-in-part of application No. 15/490,852, filed on Apr. 18, 2017.

(51) Int. Cl.
| | |
|---|---|
| *G06F 9/44* | (2018.01) |
| *G06F 11/36* | (2006.01) |
| *G06F 9/451* | (2018.01) |
| *G06F 40/40* | (2020.01) |
| *G06F 40/51* | (2020.01) |

(Continued)

(52) U.S. Cl.
CPC ............ *G06F 11/362* (2013.01); *G06F 9/454* (2018.02); *G06F 11/3664* (2013.01); *G06F 40/166* (2020.01); *G06F 40/40* (2020.01); *G06F 40/51* (2020.01); *G06F 40/58* (2020.01)

(58) Field of Classification Search
CPC ............ G06F 9/44589; G06F 11/3664; G06F 11/3684; G06F 11/3688
See application file for complete search history.

(56) References Cited

U.S. PATENT DOCUMENTS

| | | |
|---|---|---|
| 5,797,011 A | 8/1998 | Kroll et al. |
| 7,996,417 B2 | 8/2011 | Travieso et al. |
| 9,128,918 B2 | 9/2015 | Travieso et al. |

(Continued)

OTHER PUBLICATIONS

Crowle S, Hole L., "ISML: An interface specification metalanguage", International Workshop on Design, Specification, and Verification of Interactive Systems, Jun. 11, 2003, pp. 362-376.

(Continued)

*Primary Examiner* — Hang Pan
(74) *Attorney, Agent, or Firm* — Sterne, Kessler, Goldstein & Fox P.L.L.C.

(57) ABSTRACT

Providing for accurate translation of elements in a web application is accomplished through systems and methods of efficiently debugging translations for error-free localization. In an exemplary approach, a source language file and a translated language file of string properties and other elements of a UI are compared, and visual coding of string properties and the other elements is generated in a user interface panel. The visual coding distinguishes among characteristics relating to translation states. Edits to the string properties can be displayed as they are made, and an ad hoc changes list produced by the edits can be exported.

15 Claims, 32 Drawing Sheets

(51) Int. Cl.
*G06F 40/58* (2020.01)
*G06F 40/166* (2020.01)

(56) References Cited

U.S. PATENT DOCUMENTS

| | | | |
|---|---|---|---|
| 9,684,653 | B1 | 6/2017 | Bhagat |
| 9,690,549 | B2* | 6/2017 | Zaiwei .................. G06F 9/454 |
| 10,229,115 | B2 | 3/2019 | Li et al. |
| 10,437,935 | B2 | 10/2019 | Sittel et al. |
| 10,489,513 | B2 | 11/2019 | Lipka et al. |
| 2002/0052893 | A1 | 5/2002 | Grobler et al. |
| 2002/0144253 | A1 | 10/2002 | Kumhyr |
| 2002/0162093 | A1 | 10/2002 | Zhou et al. |
| 2004/0049374 | A1 | 3/2004 | Breslau et al. |
| 2004/0128614 | A1 | 7/2004 | Andrews et al. |
| 2004/0167768 | A1* | 8/2004 | Travieso ............... G06F 17/289 704/2 |
| 2007/0033579 | A1* | 2/2007 | Andrews ................ G06F 8/71 717/136 |
| 2008/0133216 | A1 | 6/2008 | Togami |
| 2008/0221868 | A1 | 9/2008 | Melnick et al. |
| 2009/0024936 | A1 | 1/2009 | Ragan |
| 2009/0030674 | A1* | 1/2009 | Chakra .................. G06F 9/454 704/8 |
| 2009/0089758 | A1 | 4/2009 | Chen et al. |
| 2010/0023735 | A1 | 1/2010 | Moyer |
| 2010/0042929 | A1 | 2/2010 | Berry et al. |
| 2010/0088085 | A1 | 4/2010 | Jeon et al. |
| 2010/0211827 | A1 | 8/2010 | Moyer et al. |
| 2011/0010162 | A1* | 1/2011 | Elgazzar ................. G06F 17/28 704/2 |
| 2013/0290075 | A1* | 10/2013 | Kathooria ........ G06Q 10/06395 705/7.41 |
| 2013/0290933 | A1* | 10/2013 | He ..................... G06F 11/3668 717/124 |
| 2014/0006004 | A1* | 1/2014 | Gundepuneni ......... G06F 9/454 704/2 |
| 2015/0088484 | A1 | 3/2015 | Bostick et al. |
| 2015/0324336 | A1* | 11/2015 | Glezos ................ G06F 17/2247 715/234 |
| 2016/0092440 | A1 | 3/2016 | Bhuvaneswaran |
| 2016/0127418 | A1* | 5/2016 | Maes .................. H04L 41/5048 726/1 |
| 2016/0139914 | A1* | 5/2016 | Levi ....................... G06Q 10/00 717/121 |
| 2016/0283204 | A1* | 9/2016 | Zaiwei .................. G06F 9/454 |
| 2017/0083512 | A1* | 3/2017 | Bangarambandi ...... G06F 9/454 |
| 2017/0322944 | A1 | 11/2017 | Farr et al. |
| 2018/0137025 | A1* | 5/2018 | Zhang ................ G06F 11/3608 |
| 2018/0300318 | A1 | 10/2018 | Sittel et al. |
| 2018/0307683 | A1 | 10/2018 | Lipka et al. |

OTHER PUBLICATIONS

"Why AdaptiveMT is the Dawn of a New Horizon for Machine Translation", AdaptiveMt, introduced in SDL Trados Studio 2017, https://www.sdltrados.com/download/adaptivemt-white-paper/119968/, pp. 1-2.
"Not all TMs are Equal: Why upLIFT has Transformed Translation Memory", upLIFT, introduced in SDL Trados Studio 2017, https://www.sdltrados.com/download/uplift-white-paper/118721/, pp. 1-2.
Jenner, "Let's Talk About Pricing for Freelance Translation Work", 2017 SDI plc, pp. 1-4.
Greenfield, "How to Set Freelance Translation Rates", 2017 SDI plc, pp. 1-5.
Jenner, "Conflict and Resolution: Tricky Situations and Unreasonable Customers", 2017, SDL plc, pp. 1-4.
Stockley, "Grow Your Freelance Translation Business with Twitter", 2017 SDL plc, pp. 1-8.
Stockley, "The Freelance Transators' Guide to Using LinkedIn", 2017 SDL plc, pp. 1-7.
Stockley, "Setting up a Freelance Translation Website", 2017 SDL plc, pp. 1-8.
Jenner, "Habits of Highly Successful Translators and Interpreters", 2017 SDL plc, pp. 1-4.
Greenfield, "Ramping Up Your Freelance Translation Business", 2017 SDL plc, pp. 1-5.
"SDL Trados GroupShare 2017", Language White Paper, 2017 SDL plc, pp. 1-12.
Robinson, "How does Alexika select freelance translators to work on projects—what are we looking for", 2017 SDL plc, pp. 1-5.
Big Data and Text Analytics: Solving the Missing "Big Language" Link, Jan. 2013 SDL pic, pp. 1-8.
"Modern Translation Guide, A Roadmap to Radially Simplified Translation", 2014 SDL plc, pp. 1-8.
Kelly, "How You Can Win More Freelance Translation Work", SDL 2013, pp. 1-6.
Greenfield, "Attracting and Retaining Top Linguists", SDL 2013, pp. 1-5.
Jenner, "5 Habits of Highly Successful People: Customer Interaction", SDL 2013, pp. 1-4.
"Terminology Management", 2014 SDL plc, www.sdl.com/terminology, pp. 1-24.
"SDL Trados Studio Professional for LSPs and Corporations", 2016 SDL plc, pp. 1-4.
"SDL* Trados GroupShare", 2017 SDL plc, pp. 1-8.
Extended European Search Report issued in European Application No. 18167940.8, dated Sep. 10, 2018; 9 pages.

* cited by examiner

```
Properties files: /Users/passkar/source/L10n/17.2/Acc_Kit_033_sanitized/lockit_20170131/full
Permitted key types names: tab, tab, button, buttons, title, titles, field, fields, breadcrumb, breadcrumbs, description, descriptions,
error, errors, info, action, actions, label, labels, select, msg, message, messages, header, headers, heading, check, radio, column,
columns, link, links, tooltip, tooltips, wapi Verifying presence of permitted key type in keys in language pack - Properties files
  metadata.properties
      Key : objecttypeattrree1popup.warning.products.mixed.catalogs [no permitted key type found]
      Key : objecttypeattrsel1popup.warning.products.mixed.catalogs [no permitted key type found]
      Key : objecttypeattribute1ist.breadcrumb2 [no permitted key type found]
      Key : objecttypeattribute.confirm.change.value.type [no permitted key type found]
476 — Key : objecttypeattribute1ist.text.deprecated [no permitted key type found]
      Key : objecttypeattrsel1popup.warning.categories.mixed.catalogs [no permitted key type found]
  priceadjustmentlimits.properties
      Key : add.amount.hover [no permitted key type found]
      Key : add.amount.hover [no permitted key type found]
      Key : add.amount.placeholder [no permitted key type found]
      Key : add.type.item [no permitted key type found]
      Key : add.type.hover [no permitted key type found]
      Key : add.unit.hover [no permitted key type found]
      Key : add.type.order [no permitted key type found]
      Key : add.type.shipping [no permitted key type found]
  catalog.properties
      Key : cquotientfeedsettings.text.running [no permitted key type found]
      Key : cquotientfeedsettings.text.running [no permitted key type found]
      Key : powerreviewsfeedsettings.alt.refresh [no permitted key type found]
      Key : cquotientfeedsettings.threshold.success [no permitted key type found]
      Key : categorypassignconfig.text.value.missing [no permitted key type found]
      Key : catalogcarouselpopup.alert [no permitted key type found]
```

FIG. 4B

```
Loc. kit: /Users/pmaskar/source/l10n/17.2/Loc Kit 033 Original/lockit_20170119/full
Sanitized loc. kit: /Users/pmaskar/source/l10n/17.2/Loc Kit 033 Sanitized/lockit_20170131/full Comparing files in direction - Loc. kit vs. Sanitized loc. kit
No difference found
Comparing files in direction - Sanitized loc. kit vs. Loc. kit
No difference found
Comparing keys in direction across language packs - Loc. kit vs. Sanitized loc. kit
No difference found
Comparing keys in direction across language packs - Sanitized loc. kit vs. Loc. kit
shop_fault_message.properties [missing keys in 'Loc. kit']
    Key : 'com.demandware.wapi.resource.shop-order2.exceptions.InvalidGiftCertificateItemAmountException'
category.properties [missing keys in 'Loc. kit']
    Key : 'updatecategoryattributesection.job.copy_categories.description'
Comparing values of keys in direction across language packs - Loc. kit vs. Sanitized loc. kit
priceadjustmentlimits.properties
    Key : add.amount.hover [different values]
        Loc. kit : Enter an amount.
        Sanitized loc. kit : Enter an amount
    Key : add.type.hover [different values]
        Loc. kit : Select a type
        Sanitized loc. kit : Select a type.
    Key : add.unit.hover [different values]
        Loc. kit : Select a unit
        Sanitized loc. kit : Select a unit.
meta_fault_message.properties
    Key : com.demandware.wapi.exception.UnsupportedContentTypeException [different values]
        Loc. kit : Unsupported media type "{0}" in Content-Type header. Note\: Only UTF-8 charset is supported.
        Sanitized loc. kit : Unsupported media type '{0}' in Content-Type header. Note\: Only the UTF-8 charset is supported.
    Key : com.demandware.wapi.resource.meta.rest.exception.VersionNotFoundException [different values]
        Loc. kit : Version "{0}" not found.
        Sanitized loc. kit : Version '{0}' not found
    Key : com.demandware.wapi.resource.meta.rest.exception.ApiNotFoundException [different values]
        Loc. kit : Api with name "{0}" not found.
        Sanitized loc. kit : The API with name '{0}' was not found.
```

```
source_vs_targetxt ⊠
  Target directory
    Target Pack: /Users/pnaskar/source/L10n/17.2/Loc Kit 033 Translations/JA
  Source directories
    FULL: /Users/pnaskar/source/L10n/17.2/Loc Kit 033 Sanitized/lockit_20170131/full
    CHANGE: /Users/pnaskar/source/L10n/17.2/Loc Kit 033 Sanitized/lockit_20170131/changed
    NEW: /Users/pnaskar/source/L10n/17.2/Loc Kit 033 Sanitized/lockit_20170131/new Comparing number of files in - Target Pack vs. FULL
    Number of files in Target Pack is: 108       765
    Number of files in FULL is: 112
  Comparing files in direction - Target Pack vs. FULL
    No difference found
  Comparing keys in direction across language packs - FULL vs. Target Pack
    No difference found
  Comparing keys in direction across language packs - CHANGE vs. Target Pack
    No difference found
  Comparing keys in direction across language packs - NEW vs. Target Pack
    No difference found
  Comparing parameters in values across language packs (ignoring order) - FULL vs. Target Pack
    No difference found
  Comparing parameters in values across language packs (ignoring order) - CHANGE vs. Target Pack
    No difference found
  Comparing parameters in values across language packs (ignoring order) - NEW vs. Target Pack
    No difference found
```

STEP 1: Shipping » STEP 2: Billing

SELECT OR ENTER SHIPPING ADDRESS - REQUIRED

- First Name
- Last Name
- Address 1
- Address 2
- City/Town
- County
- Postal Code                Example : SW42 4RG
- Country                    United Kingdom
- Phone                      Example : 01222 555 555

☐ Use this address for Billing

Is this a gift?   ○ Yes   ⊙ No

Why is this required?

FIG. 20 self.clue++

Mein Erfahrungen beim loten und Programmieren

21 Einträge mit dem Tag "tools":

2015-03-25 Comparing some oscilloscopes and their probes

Since my review of the TBS1052B-EDU scope I participated in yet another Element14 contest - and part of the provided kits was yet another scope. This time it has been a TBS1202B-EDU, the larger brother of my first scope. So I thought it might be a nice exercise to compare these two scopes with each other. Since this scope comes with 200MHz passive probes (in contrast to the 50MHz probes of the TBS1052B-EDU) I will compare them too. To make it a real shootout (and to even more insight) I will include my iMSO-104 scope too, which has meager 5MHz analog bandwidth and 12 Msps sample rate.

Weiter lesen

2015-03-20 SPG8640-based crystal frequency generator

One of the tools that belong in every electronics toolset is a frequency generator. There are many design out in the internet that to build your own generator. Starting with a simple 555 timer (or even just transistors), moving up to the venerable XR2206 and ICL8038 and then maybe up to the MAX038 they typically can generate sine, triangle and square wave over a wide frequency range.

But they all rely on manual frequency setting, and their accuracy is in the single digit percent range (maybe as good as 0.1%). If you want to have a stable frequency source, you need a crystal based oscillator - and that typically means using a DDS chip.

When I needed a small frequency generator for a project several years ago, I did neither had the time nor the skills to build something like that. But I had in my parts box a nice chip that seemed perfect for a small tool - the SPG8640BN.

Weiter lesen

2015-03-15 Building an ATX power supply

Using ATX PSU as basis for a lab power supply is an easy way to get started when building a lab power supply. It solved all the hard parts about wiring the transformer and the voltage regulation stuff, and basically leaves only the wiring. Especially when one needs some high-current PSU, this a nice way to get a simple solution. So I had this on my 'projects to do' list for a while (and even started to get some components). So when I stumbled over a nice project by an italian electronics hobbyist I was intrigued. Francesco truzzi did a great job not only on creating a nice breakout PCB, but also on adding some additional features. So when he offered to send his surplus PCBs to readers of his blog I took my chance.

- Front Page
- Archive (by month)
- RSS
- ATOM

Categories
- arduino(1)
- contests(20)
- development(8)
- efm32(1)
- electronics(74)
- fpga(11)
- learning(7)
- meta(3)
- people(3)
- pic(1)
- projects(34)
- psoc(5)
- sensor(2)
- software(2)
- tools(21)
- work(3)

Credits
Design by inevablestyle
Powered by nanoc

Contact
By Hendrik Lipka
Just send me an Email!
Homepage
Find me on Google+

WEBSITE DEBUGGER FOR NATURAL LANGUAGE TRANSLATION AND LOCALIZATION

PRIORITY APPLICATIONS

This application is related to and claims priority as a continuation-in-part of U.S. patent application Ser. No. 15/491,952 entitled "WEB APPLICATION LOCALIZATION" filed Apr. 19, 2017. The related application is hereby incorporated by reference for all purposes.

This application is related to and claims priority as a continuation-in-part of U.S. patent application Ser. No. 15/490,852 entitled "NATURAL LANGUAGE TRANSLATION AND LOCALIZATION" filed Apr. 18, 2017. The related application is hereby incorporated by reference for all purposes.

FIELD OF DISCLOSURE

The field of disclosure relates to accurate translation of elements in a web application via internationalization (I18n) and localization (L10n)—enabling applications to handle to different languages, regional differences and technical requirements of a target market locale. Internationalization is the process of designing a software application so that it can be adapted to various languages and regions. Localization is the process of adapting internationalized software for a specific region or language by adding locale-specific components and translating text.

The methods disclosed include managing digital data for a plurality of tenants to software instances, each tenant of the plurality of tenants comprising a group of users who share a common access with a specific set of privileges to a software instance of at least one application.

INTRODUCTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

In today's world, web applications that serve and manage millions of Internet users are faced with the challenge of delivering applications globally, in the languages needed by end users—providing efficient, usable platforms for interactions and user experiences.

Web application developers often focus almost exclusively on the development of features for a platform, and are unfamiliar with requirements for internationalization and localization of the platform being developed. Often, little thought is given to designing a software application so that it can be adapted to various languages and regions without engineering changes to handle different languages and locales. Existing approaches often include developers embarking on localization only in the quality assurance (QA) stage, and even then the scope regarding custom logic and third party integrations often remains unclear to developers. It is a common situation for linguistic quality to be unreliable, terminology to be inconsistent and stylistic choices to appear random, so that a web site or application feels "translated" instead of "native".

Developers need a better approach for effectively supporting accurate translation of GUI elements in a web application—meeting internationalization and localization requirements, and also meeting the need for ongoing updates that appear native to their global users. After implementation of their web application, localization managers who utilize the website application struggle to find all of the translatable content. Text that needs to be translated may be located in extensible markup language (XML) or properties files and is in some cases even embedded in code, referred to as "hard-coded".

The disclosed systems and methods provide translation debugging tools for efficiently debugging translated web pages in a web application via localization for applications, including those delivered via large web sites.

These tools make it possible to deliver translated web applications of higher linguistic quality, seamless native experiences for global users of the web applications, effective use of development resources, efficient translation to a production quality web platform or application, multiple target languages released simultaneously, and easy ongoing updates for site maintenance. The disclosed technology scales nicely, so that four, fourteen or forty languages can be released in parallel.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 4B shows the report generated by running the key name verification tool on the property files in a selected folder.

FIG. 6A shows the report generated by running the post-merge sanitization check tool shown in FIG. 5.

FIG. 6B, FIG. 6C, and FIG. 6D show examples of errors identified via the tools, and reports that show the results after the errors have been fixed.

FIG. 7B shows the report of results for the post-merge sanitization check tool shown in FIG. 7A.

FIG. 12D shows an example report resulting from the LVT, which compares the original language pack before linguistic in-context testing, to the final language pack.

FIG. 13 shows one implementation of debug mode, for a translation into Japanese.

FIG. 17 shows an example form fill web page translated into British English, also referred to as locale 'EN_GB', with no debug mode shown.

FIG. 18 shows a blog page partially translated into German with locale 'de', without debug mode.

FIG. 19 shows the example form fill web page of FIG. 17, with the disclosed L10n debugging tool highlighting the non-translated strings.

FIG. 20 shows a blog web page with non-translated strings highlighted using one pattern and translated strings highlighted in a contrasting pattern.

FIG. 21 displays an example string property edit panel on the left side of the form fill web page that shows the name of the label in the web page and under the label, the actual string used for the label.

FIG. 22 displays an example string property edit panel on the left side of the blog web page that shows the name of the label in the web page and under the label, the actual string used for the label.

FIG. 23 shows an example of the L10n debugger feature for previewing desired changes to strings on the form fill web page.

FIG. 24 shows an example of the L10n debugger feature for previewing desired changes to strings on the blog web page.

DETAILED DESCRIPTION

Figure 1:
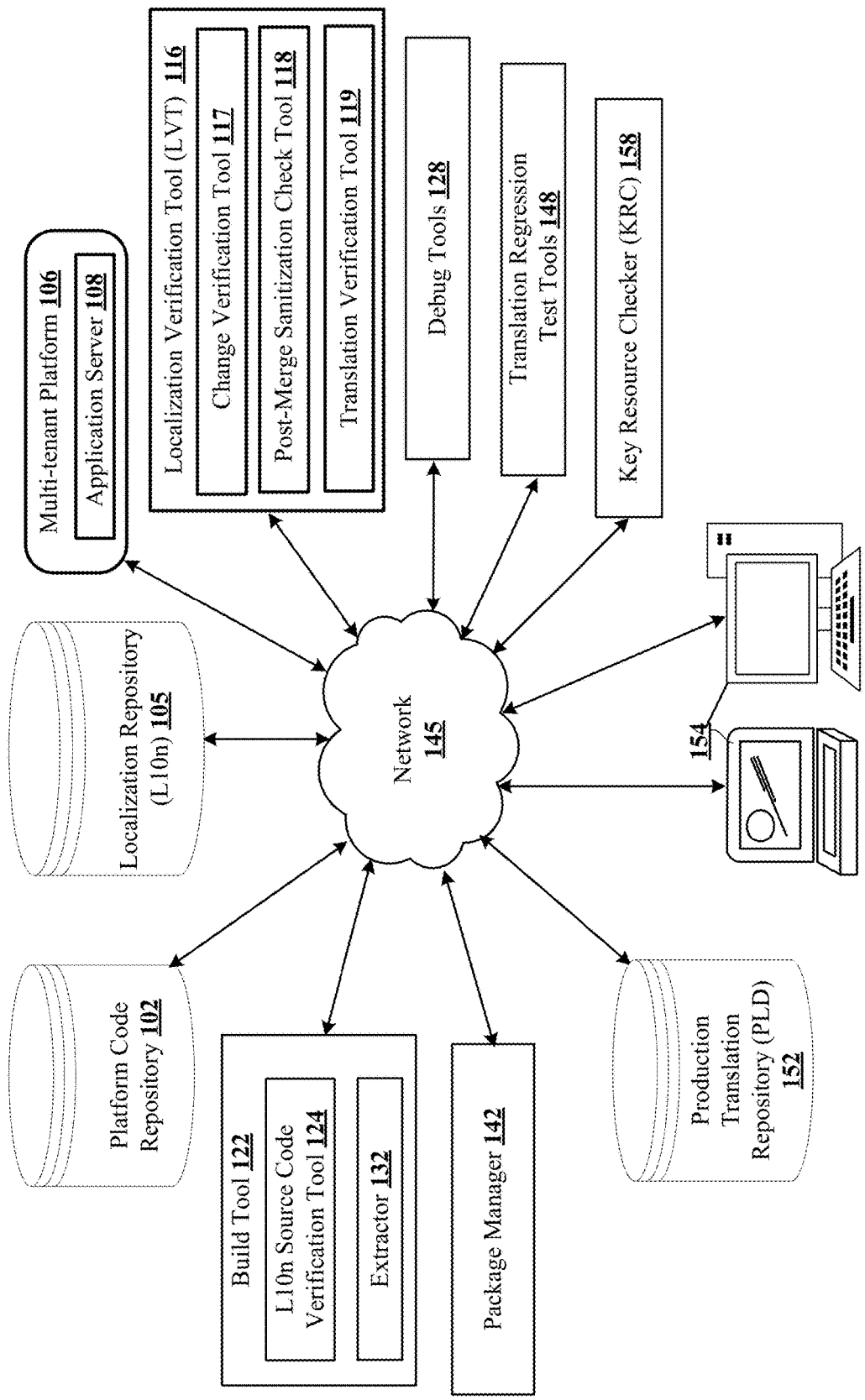
FIG. 1 illustrates an environment for accurate translation of elements in a web application.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Globally, web applications and platforms communicate information to millions of users internationally—with as many as a thousand pages for advanced web applications. Developers of the applications and platforms need to consider various web page formats and forms used to present information to and gather information from users, including address forms, date formats, currency formats, payment methods, shipping methods, taxation, gift registry events, and search key words. To address the need for translation of a website to multiple languages, translatable text needs to be localized.

Incomplete translations of a website can result in foreign characters getting garbled, text being truncated or running over the allocated space on the page, numbers showing in English format, and seemingly mismatched strings of characters that are difficult to map to the user interface (UI). Additionally, concatenation of strings and recycling of strings can cause grammatical problems in translations. Hundreds of developers create text, and not all are native speakers or follow a language style guide for the application UI. Developers in the design phase need to consider localization (L10n) requirements that define functional adaptations that enable designing a software application that can be adapted to various languages and regions without ongoing engineering changes. An internationally used web application is only as good as its translations, which are often not tested in context. For example, a web application that utilizes 125 functional modules can include a thousand web pages to deliver its content, with as many words to be translated as an average Harry Potter novel: approximately 180,000 words, requiring approximately 8000 property keys to uniquely identify each text string.

After its initial localization an international web application is only as good as its next update, so website and application developers need a maintenance strategy for L10n.

The disclosed systems and methods include translation debugging tools for efficiently debugging translated web pages, by visually differentiating parts of the web page in different states of translation—with a website debug mode that can highlight the various strings in UI controls and show the origin of the strings in the source code. In addition, the translation debugging tools allow ad hoc changes, cached for the duration of the debug session, and exportable via a zip archive. Users are able to efficiently debug translated web pages, by visually differentiating parts of the web page in different states of translation. The disclosed translation debugger compares string properties in a source language file and a translated language file and generates and displays visually coded string properties that are (a) translated, (b) intended to be but not translated, (c) not intended to be translated, and (d) modified during debugging. The debugger accepts on-the-fly edits to string properties, modified during debugging, and displays the modified string properties in a WYSIWYG panel. It exports an 'ad hoc changes list' of string properties modified on-the-fly.

An environment for accurately and efficiently translating large web applications into multiple languages, via internationalization and localization, is described in the "environment from prior application" section. Environment 100, described infra, includes debug tools 128 which include the enhanced translation debugging tool described next.

Enhanced Debugging Tool

Much of the sections that follow are from the prior application U.S. application Ser. No. 15/491,952 entitled "WEB APPLICATION LOCALIZATION" filed Apr. 19, 2017. This section describes the added technology that goes beyond what was disclosed in that application.

Examples are described that show the results of using a translation debugger, comparing a source language file and a translated language file of string properties and other elements of a user interface, and generating WYSIWYG panel of the user interface. Visual coding of the string properties and the other elements, distinguishes among characteristics relating to translation states, in preparation for accepting on-the-fly edits to string properties in a string property edit panel, as shown infra. The examples also show display of modified string properties in the WYSIWYG pane. The ad hoc changes list of modified string properties produced by the on-the-fly edits gets exported as described, after the WYSIWYG examples described next.

Figure 18:
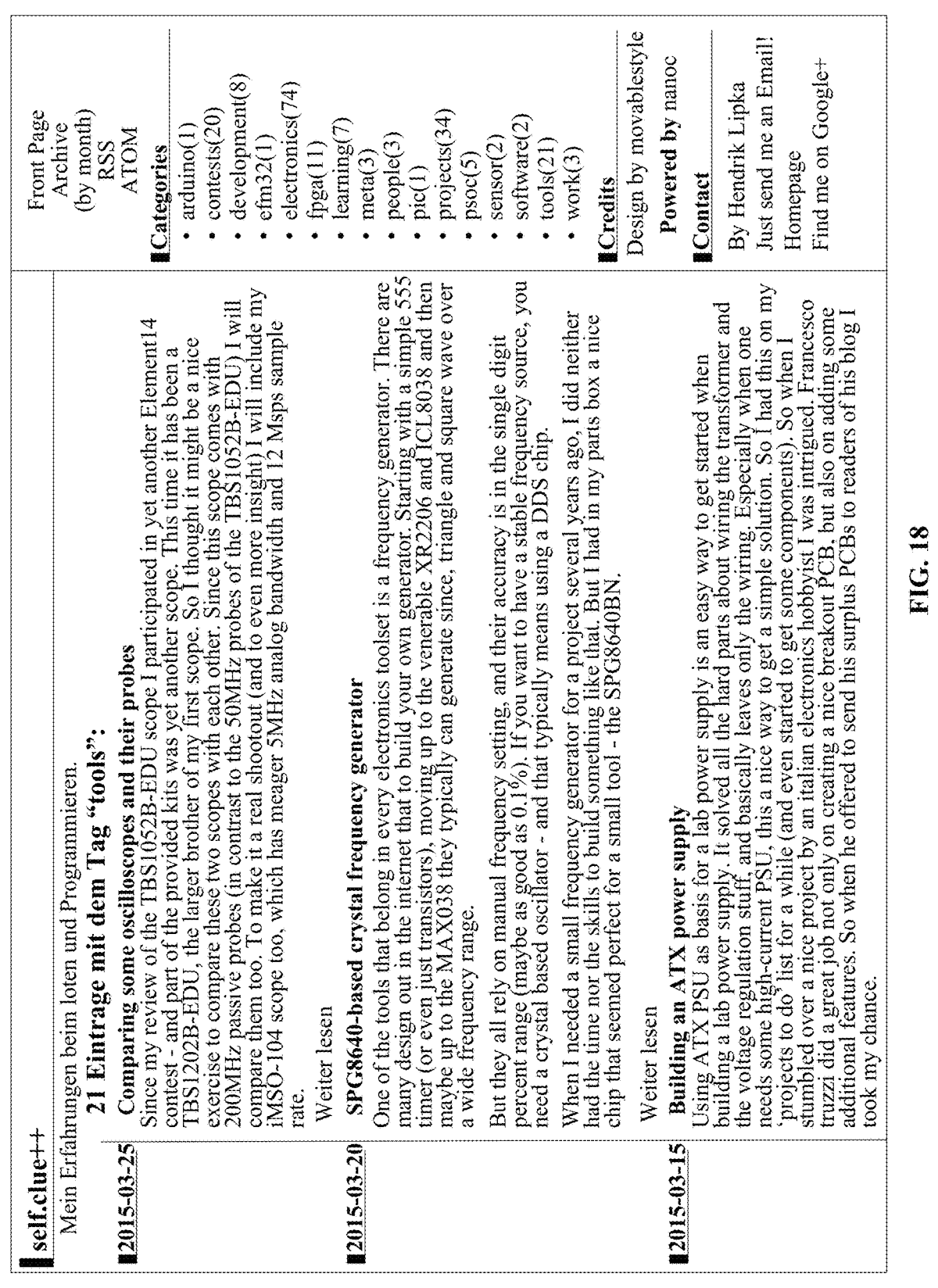

FIG. 17 shows an example form fill web page translated into British English, with the locale set to 'EN_GB', with no debug mode shown. It is difficult to identify where strings come from on the web page and which strings differ from the source site with the locale set to 'EN_US'; that is, which strings have been translated and which ones have not been translated. FIG. 18 shows what a blog page partially translated into German with the locale set to 'de' looks like without debug mode. It is challenging to tell where strings come from on the web page and which ones differ from the source site with the locale set to 'EN_US'; that is, which strings have been translated and which ones have not been translated.

The disclosed translation debugger compares a source language file and a translated language file of string properties and other elements of a user interface, and generates in a what-you-see-is-what-you-get (WYSIWYG) panel of the user interface, visual coding of the string properties and the other elements. The visual coding distinguishes among characteristics relating to translation states.

Text on a web page can be in one of five translation states. Each of the states is distinguished with unique visual coding by the website debugger. Some text may not be marked for translation. In this case, that text is not highlighted. This could be text which is data from the underlying application such as descriptions of items for a web page list or the blog entries such as those shown in the blog example, described infra. Such data is provided and translated by a user of the application such as an ecommerce merchant or the blog author, so it is not part of the development localization workflow. Some text is marked for translation, but has not yet been translated into the current locale. Other text is marked for translation and has been translated. Additional text has been changed or entered in the website debugger, but is available only locally, so is not available to other users. Finally, a fifth state refers to text that was changed or entered in the website debugger, whose changes have been saved to the server.

Figure 19:
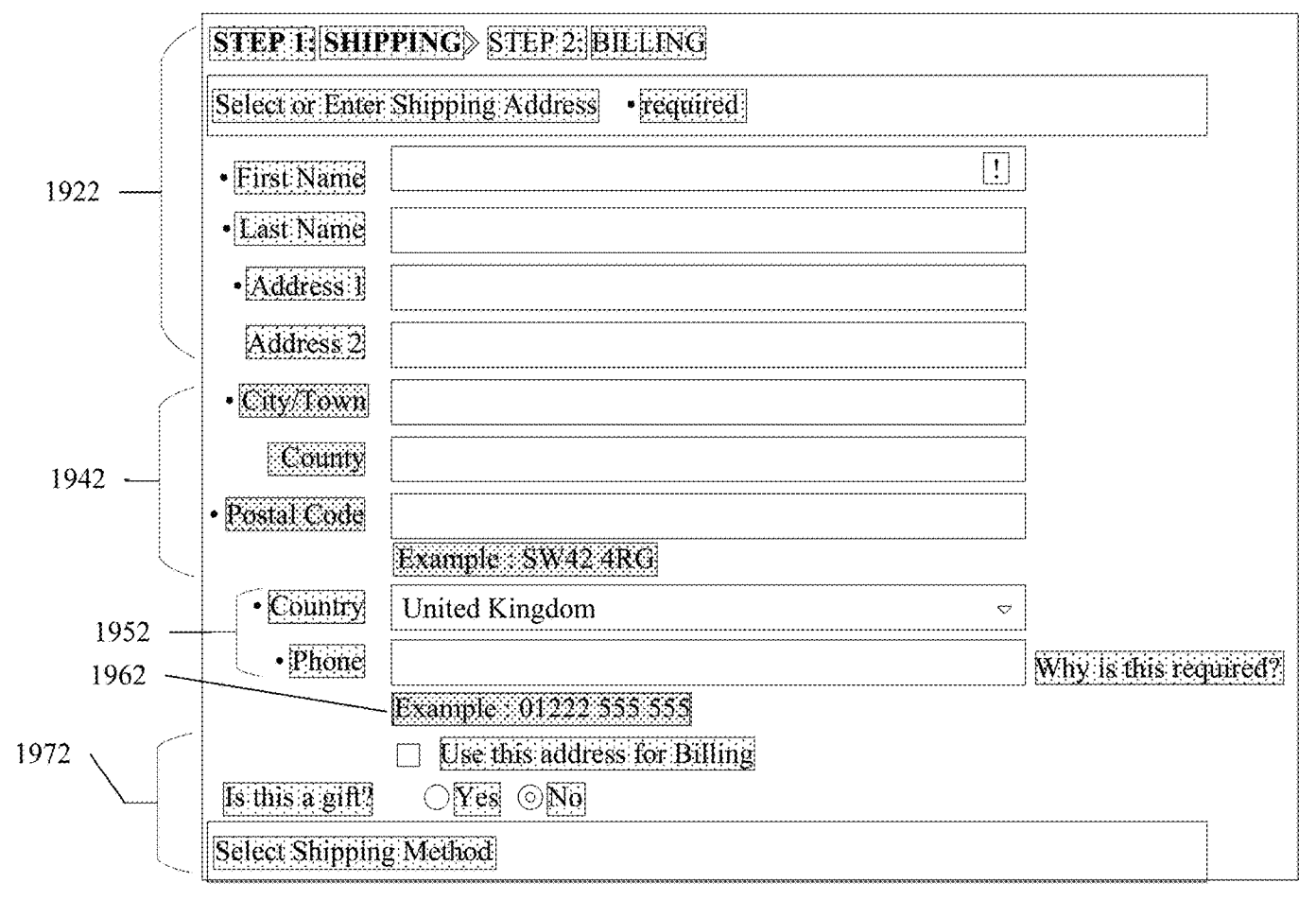

FIG. 19 shows the example form fill web page of FIG. 17, with the L10n debugging tool highlighting the non-translated strings with light shading 1922, 1952, 1972. In contrast, the strings pulled from a translated file show in a slightly darker shading 1942, 1962. With the two distinct visual codings of states, non-translated strings are easy to identify.

The disclosed technological solution of visual coding can be utilized for any web page. FIG. 20 shows a blog web page partially translated into German, with strings to be translated with light shading 2022, 2018, 2078 and strings already translated visually coded with a slightly darker shading 2022, 2032, 2062.

The disclosed translation debugger accepts on-the-fly edits to string properties in a string property edit panel, making it possible for users to change text 'on the fly'. The debugger displays modified string properties in the WYSIWYG panel so users can preview their on-the-fly edits. That is, the preview feature offers users the option to 'try out' text to test its specific contextual quality, such as phrasing, length and special characters represented on the web page being translated.

Figure 21:
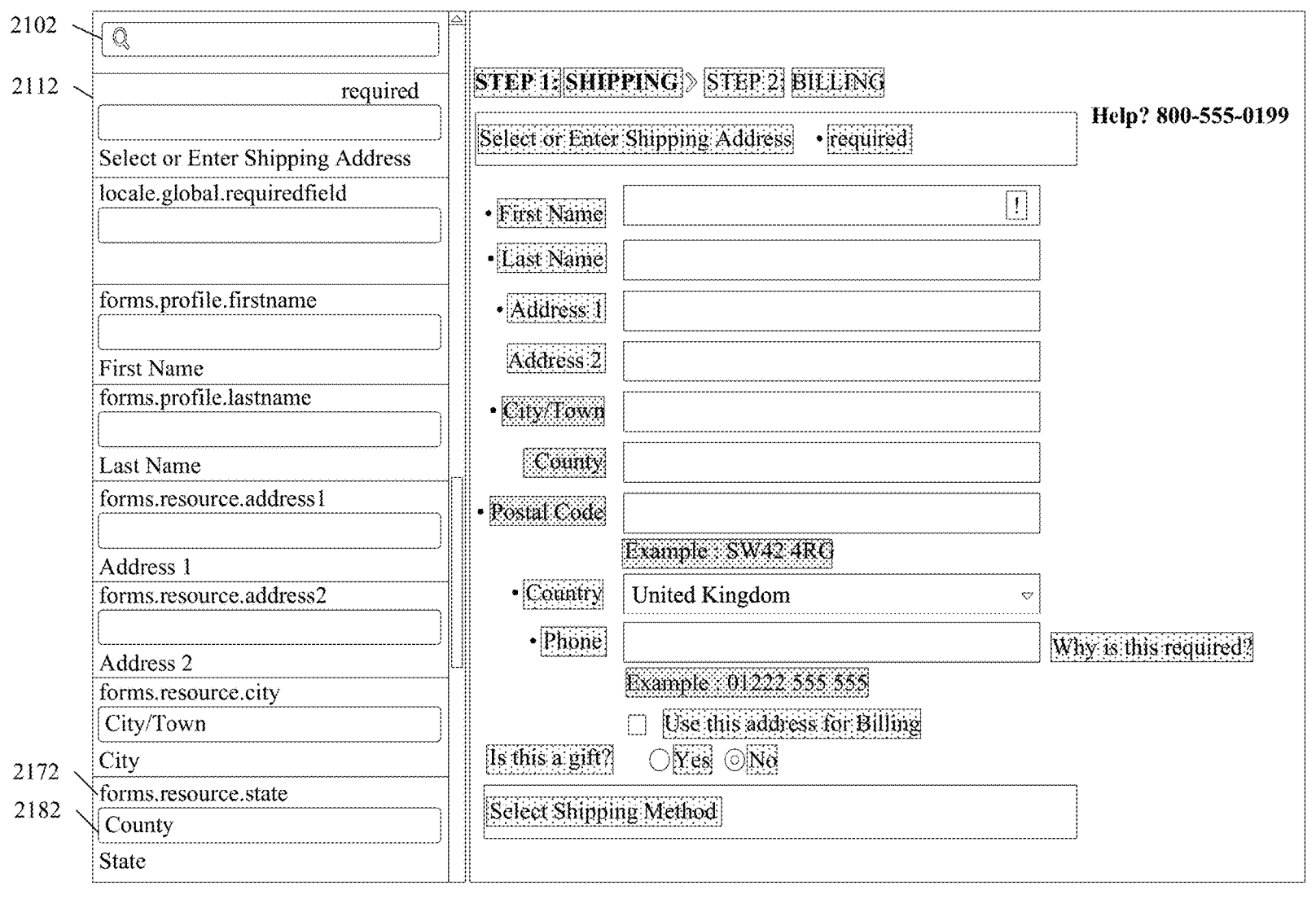
Figure 22:
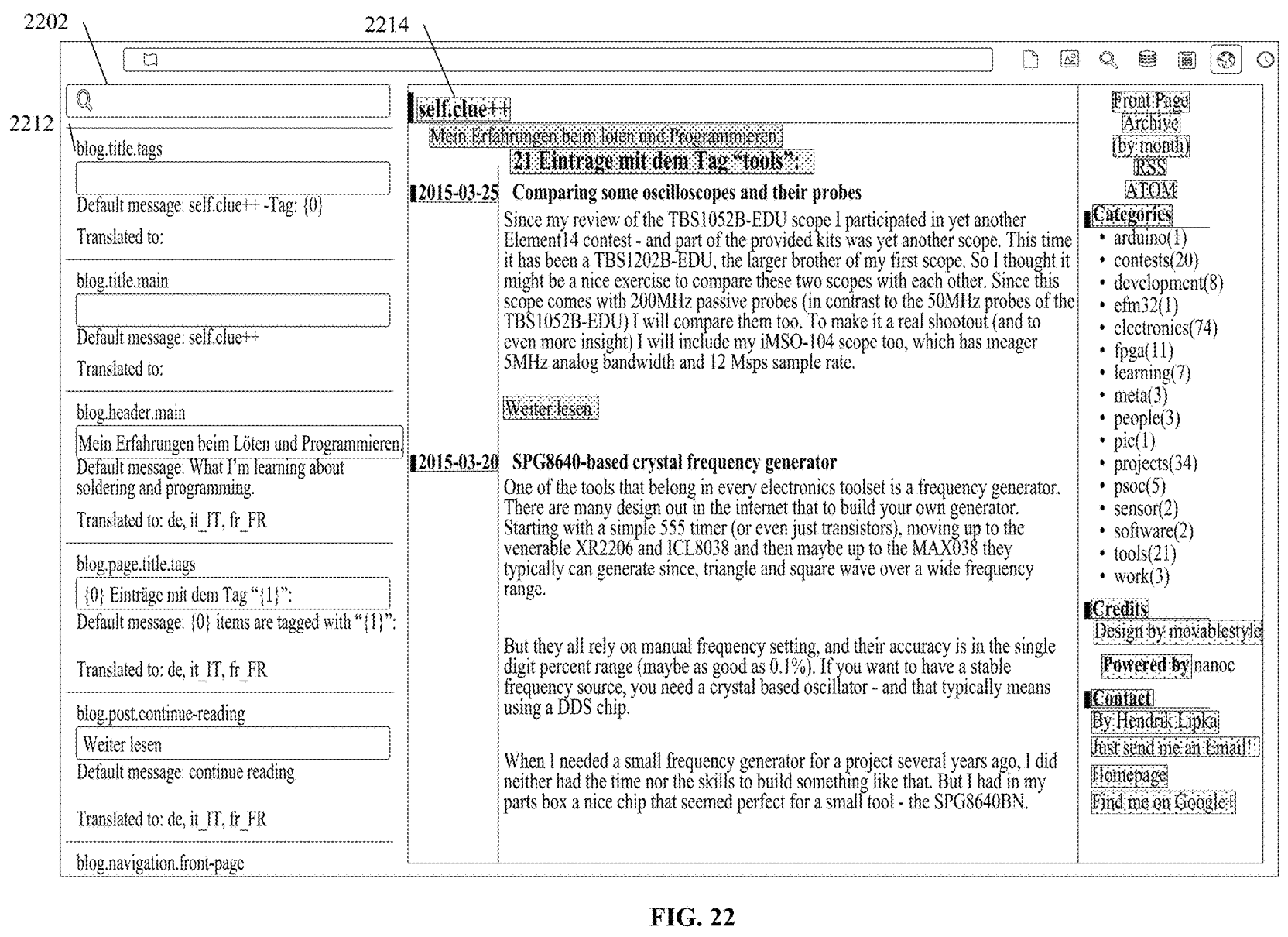

FIG. 21 displays an example page with a string property edit panel 2112 on the left side of the page that shows the name of the label in the web page and under the label, the actual string used for the label. For example, county 2182 is the current string used for the label in the field 'forms.resource.state' 2172. Using the string property edit panel 2112, it is possible to identify the origin of a string in the web page and also to make ad hoc changes to the string to assure contextual accuracy of the string. FIG. 21 shows a digital form fill web page example and FIG. 22 shows the example web blog. The label for untranslated text 2214 is shown as 'blog.title.tag' 2212, with the string property edit field empty, and available for the user to add a translated blog title. An additional functionality of the disclosed translation debugger is filtering by key or message via a search input 2102, 2202.

Characteristics relating to translation states include distinct marking of (a) translated string properties, (b) string properties intended to be but not translated and (c) other elements not intended to be translated. Markers, described infra, are usable to visually code the different string types distinctly. In the examples described, the distinct marking of (a) translated string properties is slightly dark shading, (b) string properties intended to be but not translated is light shading, and (c) other elements not intended to be translated include no shading or highlighting. When a page is fully translated, all text will appear in the slightly dark shading, in one example, with no text with the light shading. For some websites and some web pages, not all text is to be handled by the regular translation process. For example, a pseudonym in use by a blogger is not intended to be translated, even when the blog page is translated to different languages.

Figure 23:
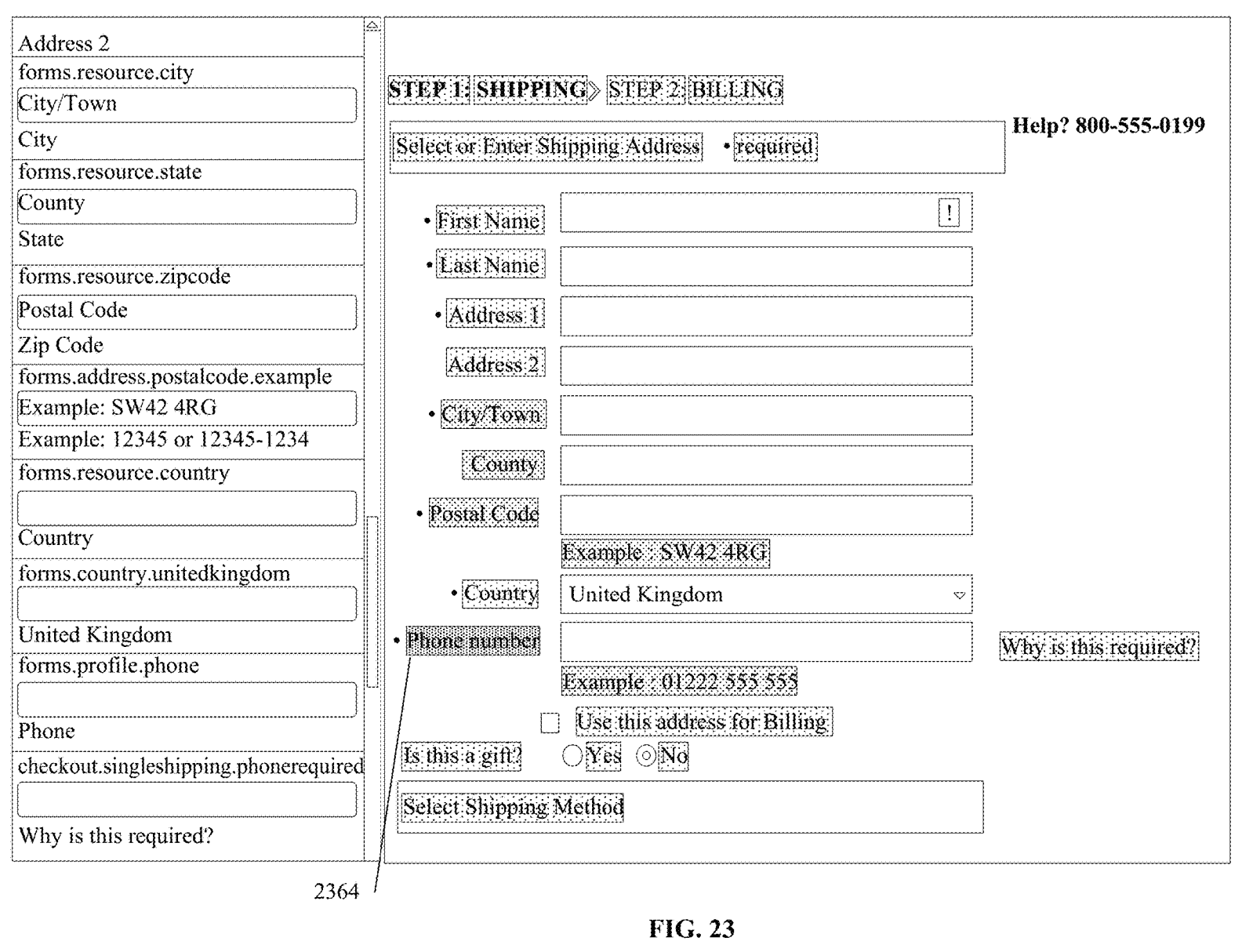

FIG. 23 shows an example of the translation debugger feature for previewing desired changes to strings on the web page. In this example, strings visually coded with dark shading have been previously translated and then modified by a user. For example, 'phone number' 2364 has been previously edited and saved and is being shown as modified.

Figure 24:
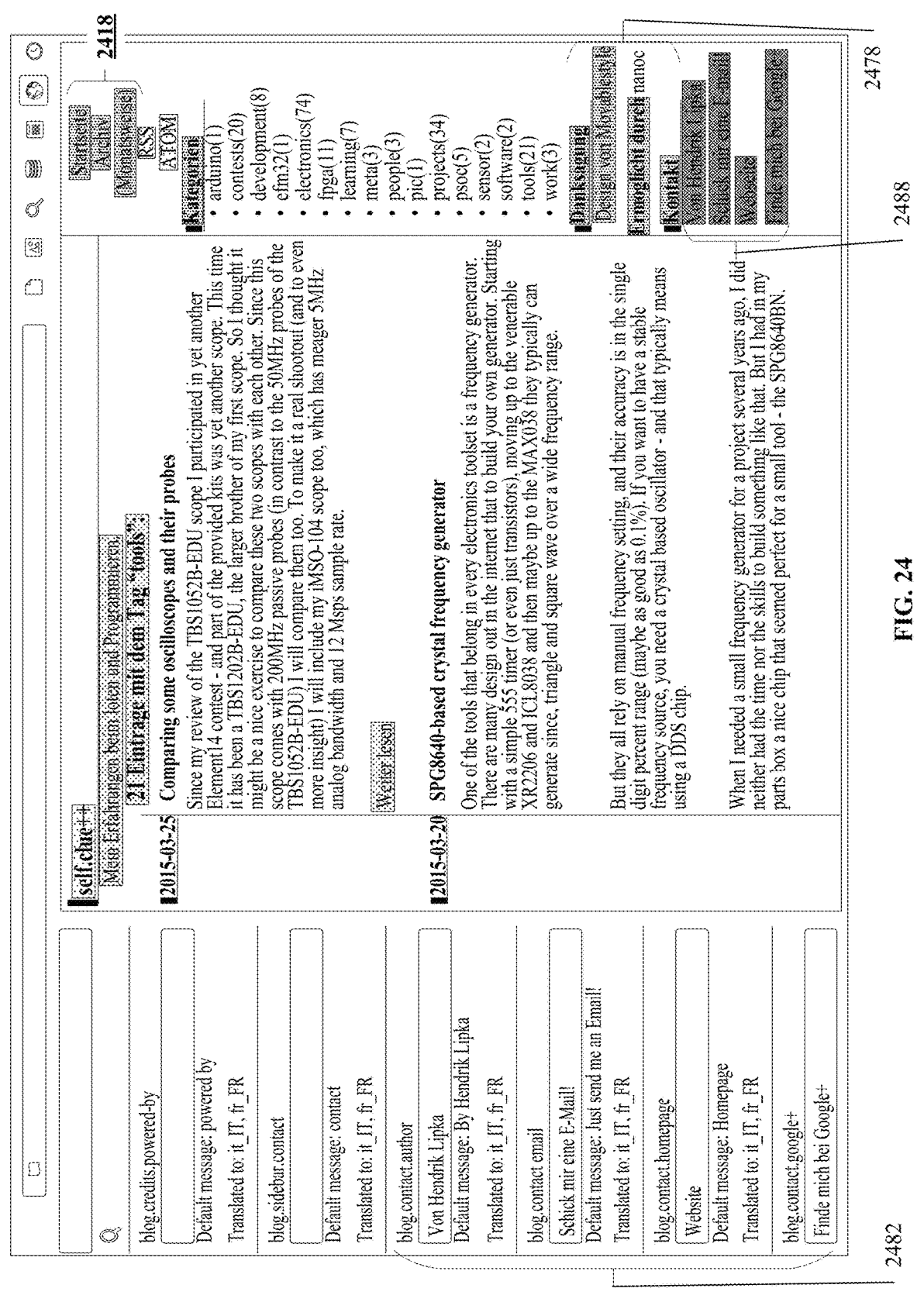

The user of the debugger can edit for translation by entering a new literal or overwriting a literal, as shown in the left side panel. FIG. 24 shows the blog example with string properties that have been modified during prior debugging sessions—that is, that have been previously translated. These strings are visually coded with striped shading 2418, 2478. Strings for which a translation had not existed before and a translation was then added in the preview panel 2482 are referred to as string properties added or modified by on-the-fly edits during debugging, and are visually coded with dark shading 2488.

Figure 25:
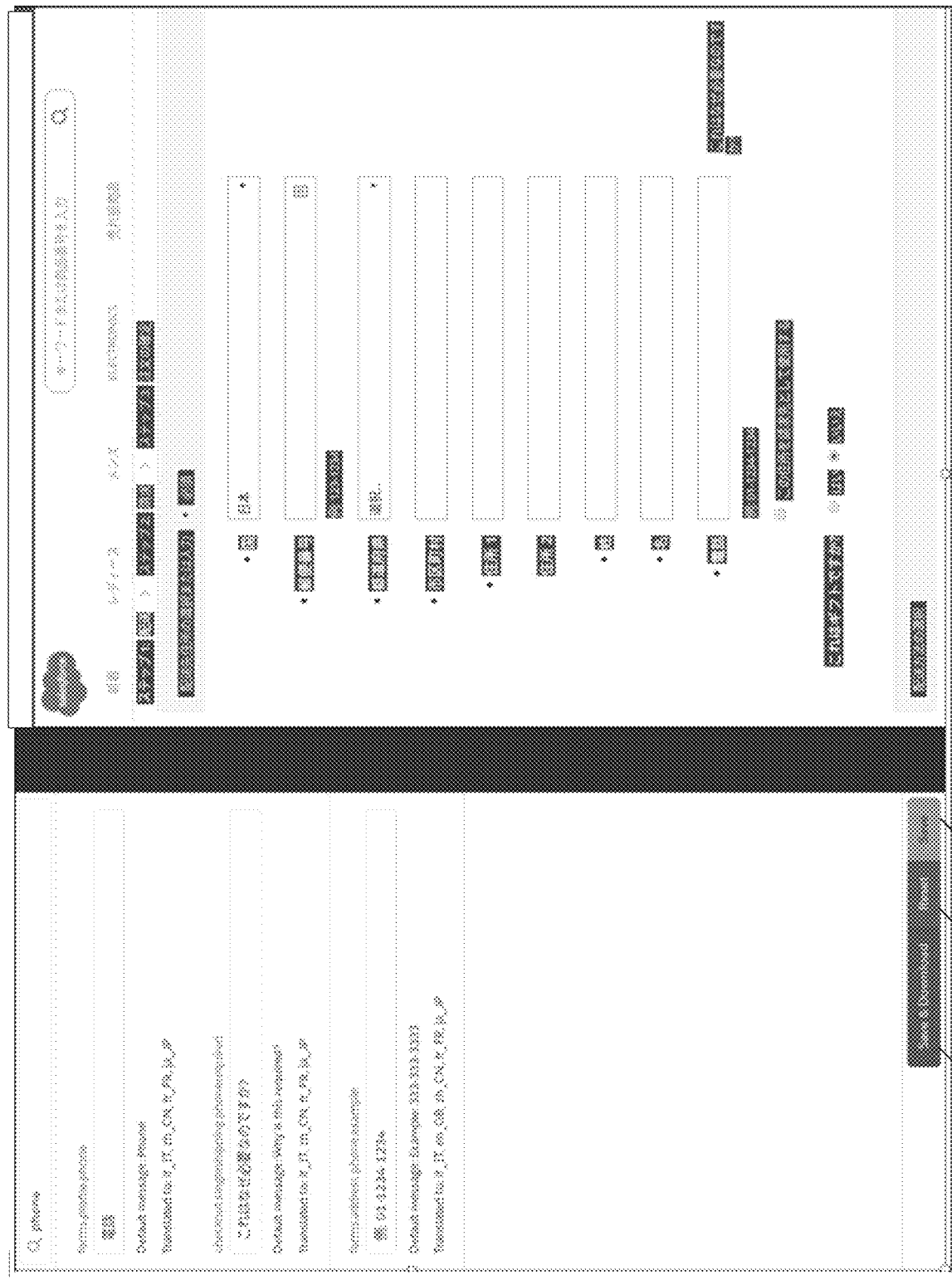
FIG. 25 shows an example form fill web page for entering contact information, translated into Japanese, which includes multiple control buttons for saving and downloading, resetting and saving changes.

FIG. 25 shows an example form fill web page for entering contact information, translated into Japanese. The debugger interface includes multiple options for handling the data using other elements. In one example, other elements include control buttons such as 'save' 2586, 'save and download' 2582 and 'clear' or 'reset' 2584.

The translation debugger exports an ad hoc changes list of modified string properties produced by the on-the-fly edits. The user can choose to temporarily save the changes made via the debugger, on the server. When doing so, the changes are kept in the cache and will be visible during navigation away from the web page and will be visible to other users of the changed page, if they are also using the debugging tool. If the user wants to keep the changes and process them, for example by importing them into a translation workflow tool, they can download a zip archive containing the changes currently stored in the cache as properties files. In one example, for the blog web page, the changes will be contained in one file named 'blog.properties'. An example of the content of a zip file of changes captured by the debugger is shown next.

contact.author=Von Hendrik Lipka
    contact.e-mail=Schick mir eine E-Mail!
    contact.google+=Finde mich bei Google+
    contact.homepage=Web seite
    credits.design-by=Design von {0}
    credits.powered-by=Ermoglicht durch
    navigation.archive=Archiv
    navigation.by-month=(Monatsweise)
    navigation.front-page=Startseite
    sidebar.categories=Kategorien
    sidebar.contact=Kontakt
    sidebar.credits=Danksagung In one implementation, web pages to be translated are represented in iFrames. A digital platform can support the translation debugger, and can include a JWT token to authenticate the user of the translation debugger. The digital platform can then be rendered with augmentations to enable the translation debugger. These consist of HTML comments and data attributes to deliver additional information and injected JavaScript. The JavaScript running in the translation debugger and the JavaScript running in the iFrame communicate via the post Message API. In one implementation, the translation debugger interactive UI can be implemented using a JavaScript library for building user interfaces, such as React.js. In another implementation the translation debugger can be implemented using a different platform with GUI features.

In one implementation of the website debugger, an application server delivers a web page with the debugger JavaScript application. The JavaScript application requests the web page that needs to be debugged, from the application server. The application server loads the web page either from the file system, when it has been stored as an HTML file, or generated dynamically from a database with business logic and layout templates to load a resultant HTML page. Then the application server injects the markup JavaScript into the resulting HTML, marks all text that needs to be translated according to translation states and delivers the combined page to the browser running the website debugger. The website shows the resultant web page in an iFrame and the markup JavaScript marks all text based on the text state determined by the application server.

In order to have the web page server render a list of all string values in HTML, markers can be inserted before and after each literal. Multiple variants of the markers are utilized to implement multiple debug mode features. An example set of markers is shown next.

1) Debug mode showing string not translated:
    [[sfcc.110n/{bundleName}/{key}/={message}]]
    In the blog example shown in FIG. 22:
    [[sfcc.110n/blog/title.main/=self.clue++]]
    2) Debug mode showing string translated:
    [[sfcc.110n/{bundleName}/{key}/
      translated={message}]]
    In the blog example shown in FIG. 22:
    [[sfcc.110n/blog/post.continue-reading/translated=Weiter
      lesen]]
    3) Debug mode showing change via the localization debug tool:
    [[sfcc.110n/{bundleName}/{key}/changed={message}]]
    In the example shown in FIG. 23:
    [[sfcc.110n/blog/sidebar.contact/changed=Kontakt]]

In one implementation, to find all literals, the JavaScript inside the iFrame listens to the 'load' event of the window object. It then iterates over all HTML nodes in the DOM, finding and replacing all occurrences of the markers using regular expressions. When a marker is found in a text node, a 'span' element is created to highlight the message. When a marker is found in an attribute node, the message is inserted as plain text and no highlighting occurs. Each time a marker is found, the information and location of the match is added to a list. When all literals have been found and highlighted, the JavaScript inside the iFrame sends a message with the list to the translation debugger, so that it can show the existing text in the side panel. The JavaScript in the translation debugger registers a 'Mutation Observer' on the document level and reruns the extraction process on each change in case new literals were inserted. If the 'Mutation Observer' API is not available it listens for 'DOM Node Inserted' and 'DOM Node Removed' events instead. In another implementation, the literals can be identified using a different software approach.

When the translation debugger is first opened, an XML http request is dispatched to retrieve a list of all localization resource bundles and translations from the server. The JavaScript inside the iFrame sends a message to the translation debugger with the locale that was used when rendering the set of web pages. This and the list of found literals are used to create the panel shown on the left in the examples described supra. The panel shows one text input for each literal that was found in the page. The input is labeled with bundle and key, filled with the current translation available in the property files, and annotated with the fallback value that will be used if no translation is available.

When the user chooses to overwrite any literals in the left panel, JavaScript reacts to the change event by sending a message to the iFrame and the JavaScript running inside the iFrame displays the change. It also modifies the visual coding of the highlights to indicate the change.

In one implementation, clicking the 'Save' button sends the changed data to the server where they are cached and become visible to other users within the context of the translation debugger. Clicking the 'Save & Download' button causes the server to create a zip archive of all saved changes and start a download of this archive. Clicking the 'Reset' button causes the server to clear the cache of changed translations.

Environment from Prior Application

FIG. 1 illustrates one environment 100 for localization for large web applications—adapting internationalized software for a specific region or language by adding locale-specific components and translating text. Environment 100 includes multi-tenant platform 106 with application server 108 with production applications, which can include one or more of customer relationship management (CRM), sales, service, marketing, data analytics, ecommerce and customized applications. Environment 100 also includes platform code repository 102 with source code for delivering an application or web site. Source code languages include but are not limited to JavaScript, Java, Google Web Toolkit (GWT), ISML, menus and forms. In one implementation, source code management is implemented using Git. In another case, Perforce, Subversion or other version control software can be utilized as a repository. Localization repository 105, in environment 100, includes several versions of localization translations for multiple languages, for in-process translations for new languages, and updates for new code versions. Localization kits include a folder that holds a full set of translation keys and strings, a 'new' folder that holds newly added keys and strings, and a 'changed' folder that holds keys and strings changed after a previous version of the source code release and associated language pack, described in detail infra. Environment 100 also includes production translation repository 152 which holds production-ready translation packs for multiple languages being delivered globally. In one example implementation, Japanese, French, Chinese and Italian language packs reside in a production translation repository, from which language packs may be retrieved and installed in a web application on a local desktop or cloud-based computer. A Nexus repository can be utilized in one use case. In other use cases, Git or other repositories can be utilized.

Continuing, environment 100 also includes build tool 122 for determining whether extraction rules are executed accurately, and for verifying tag syntax, bundle names, key names, duplications, and some quoting rules. Build tool 122 uses an L10n source code verification tool 124 to examine the templates to determine if there are errors, and flags suspicious and non-portable constructs, and keys and strings that do not adhere to rules for the translation system. Every key uses a reserved keyword as a context qualifier and an additional element that makes it unique on the page. Example rules include using each distinct key exactly once—that is, keys are unique; no empty strings are allowed, and a bundle has exactly two parts: the folder name and the file name. In one implementation, all text in one file is in a single bundle and the bundle goes to a single translator. Also included in build tools 122 is extractor 132 for extracting tagged text, including comments, from the set of code files. Additionally, key resource checker (KRC) 158, in environment 100 is a tag sanitization cleanup tool that checks whether key naming conventions that are meaningful to the translators as contextual information are being adhered to by developers—screening for approximately twenty types of user interface (UI) elements, as described in detail infra.

Also included in environment 100 is package manager 142 that can automate the process of installing, upgrading, configuring, and removing computer programs for the computer's operating system. Package manager 142 deals with packages that contain metadata, such as the software's name, description of its purpose, version number, vendor, checksum, and a list of dependencies necessary for the software to run properly. Package manager 142 can distribute software and data in archive files, and maintain a database of software dependencies and version information to prevent mismatches and missing prerequisites, and can eliminate the need for manual installs and updates.

Environment 100 further includes a localization verification tool (LVT) 116 for comparing initial extraction and post-sanitization versions of extracted tags, which includes post-merge sanitization check tool 118 configurable to compare kit versions using the preliminary localization kit and a sanitized localization kit, and translation verification tool 119, described in detail infra. In one implementation, LVT is written using the JAVA programming language. Other programming languages can be used in other implementations. Environment 100 also includes debug tools 128 for an individual translator debugging pass, during initial translation, and usable during source version versus translated version walk-throughs. In one example use by QA, debug tools 128 flag any text still in English after translation, and flag text that has been extracted but not translated. Debug tools 128 includes translation debugger, described supra. Additionally, localization regression test tools 148 in environment 100 re-combine translated elements with the web application and exercise the web pages that contain translated elements, with automated scanning of renderings of those web pages.

User computing device 154, also included in environment 100, provides an interface for administering access to developers and process owners to use for managing the translation process, via both browser UIs and mobile applications. In some implementations, user computing devices 154 can be a personal computer, laptop computer, tablet computer, smartphone, personal digital assistant (PDA), digital image capture devices, and the like.

In some implementations, the modules of environment 100 can be of varying types including workstations, servers, computing clusters, blade servers, server farms, or any other data processing systems or computing devices. Modules can be communicably coupled to the data store via a different network connection. For example, multi-tenant platform 106 can be coupled via the network 145 (e.g., the Internet) with production translation repository 152 coupled to a direct network link, and can additionally be coupled via a direct link to platform code repository 102. In some implementations, user computing device 154 may be connected via a WiFi hotspot.

In some implementations, network(s) 145 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

In other implementations, environment 100 may not have the same elements as those listed above and/or may have other/different elements instead of, or in addition to, those listed above.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Figure 2:
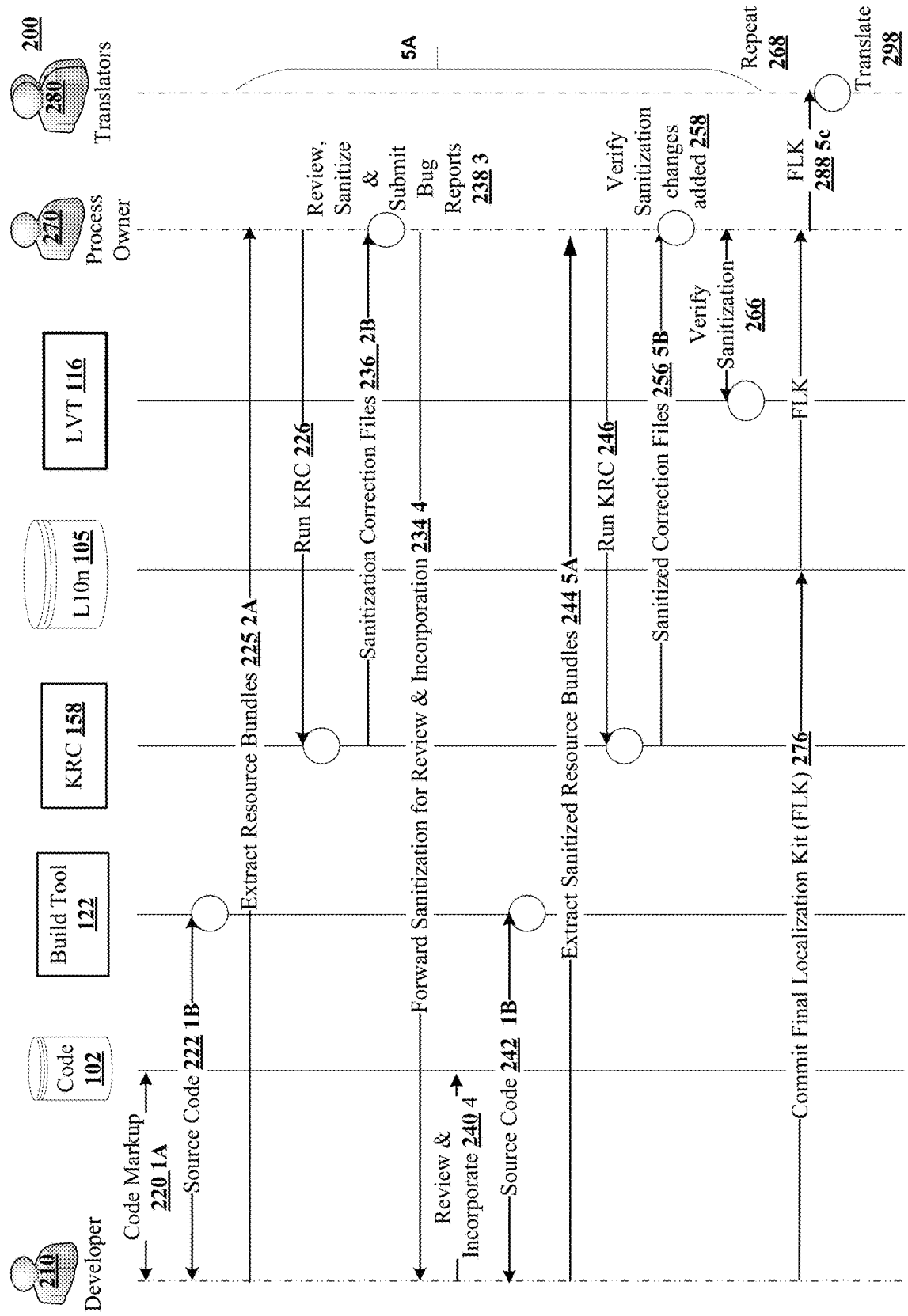
FIG. 2 shows an example message flow for preparing a web application framework for translation to multiple languages, and for creating a localization kit that is transferable to a human translator.

FIG. 2 shows an example workflow 200 for preparing a web application framework for internationalization and translation into multiple languages, and for creating a localization kit that is transferable to a human translator 280 for translation into the desired target language. The finalized localization kit can be transmitted to multiple translators for translation into as many target languages as needed during the same time interval.

Developer 210 plans for localization by designing a software application that can be adapted to various languages and regions without ongoing engineering changes—separating code and text, preparing the code, and enabling the preparation of the text. Resource bundles are stored as collections of key-value pairs, with a unique property key for each unique string. Rules for internationalization include the following: marking localizable/translatable text for extraction from the code, moving text to UI templates, using full sentences for translatable text, and avoiding concatenation of text to form a sentence, as shown next. Word order may change with language, and parameters in strings used for dynamically generated references to numbers or strings, as the code is executed, may also influence the grammar of the string at hand.

"Dear "+cust.getSalutation( )" "+cust.getLastName( )", welcome back"

Continuing with rules for internationalization, developers need to create one string for singular and one for plural use; provide a key that explains what the text is about, and how it is used; avoid HTML markup in the text; and ensure that data for the user is in the correct locale—for example, table headers are in the UI locale, even if the table header is the attribute name of a business object. Table content belongs in the data locale except when it is part of the UI, such as a 'delete' link.

Special care needs to be taken with any characters which might have a special meaning in the programming languages and technologies in use. In some cases this includes double quotes and apostrophes (used for delimiting string literals), in other cases colons. Such characters need to be handled by the proper escape sequences for the respective programming language. For example, apostrophes are treated differently from language to language and can land in the text after translation and introduce code functionality changes. Colons can also break code.

During the markup process, developer 210 includes in their code base special markup, and references to code classes, to mark the translatable text. These tags and references to code classes mark text which needs to be shown in a localized version of the UI. They are used for two purposes: for looking up, at runtime, the localized version of the text (as defined by the bundle and key); and for automated extraction of all the to-be-translated text from the affected files. In some cases these are special HTML tags, such as the markup shown next.

```
<ISTEXT bundle="customer.customergroup" key="field.type.select" default="Select type"/>
```

In other cases these can be special JSP tags. In one implementation, developer 210 includes in their code base, two code classes—LocaleHelper as public API and LocalizationHelper for implementation and can include an ISMSG module for use in the markup process, and in pulling in the translations.

<ISINCLUDE template="inc/Modules">

ISMSG tags mark text which needs to be shown in a localized version of the UI. Inside of these tags are parameters for bundle and key name, and for the default version of the text, for cases when the look-up cannot find any localized version. Optionally, the text might specify some parameters, which are then also part of the tag. A simple use case example is listed next.

```
<ISMSG bundle="customer.customergroup" key="field.type.select" default="Select Type"/>
```

This message can be found in the file customer/CustomerGroup.isml, as can be seen from the bundle name, and is part of a form—the drop-down for selecting the customer group type. Listed next is a more complex use case example, which shows a parametrized breadcrumb, containing the ID of the user group.

```
<ISMSG bundle="customer.customergroup" key="breadcrumb.rest" default="{0} - General" param0="#CustomerGroup:ID#"/>
```

Continuing with FIG. 2, developer 210 completes code markup 220, wrapping text to be localized in an ISMSG tag; using parameters as shown next; and importing any needed parameter URLs using a custom user-defined JSP tag. When a JSP page containing a custom tag is translated into a servlet, the tag is converted to operations on an object called a tag handler. The Web container then invokes those operations when the JSP page's servlet is executed.

```
<ISMSG bundle="D.F" key="K" default="some text">
<ISMSG bundle="D.F" key="K" default="Product {0}" param0="#Product:SKU#">
<%@ taglib prefix="l10n" uri="L10NTags" %>
<l10n:msg bundle="D.F" key="impex.text">Here you <l10n:param name="link">
<a href="#URL(Action('Pipeline-Start'))#" class="selection_link">
</l10n:param>manage imports</a>for images.</l10n:msg>
```

Markup of static JavaScript (JS), including JS that uses the ExtJS library, utilizes two steps. Since JS is executed by the browser at runtime and not by the application as such, the localized text needs to be transferred to the browser at runtime. The calling UI page needs to pull in the localization data, as shown next. (In some cases this is in ISML.) The localization is indirect in this case. The template provides data which the JS then uses. In some cases the markup of the to-be-translated text can look like the following example.

field: l10n("js.file", "key", "text"),

The reference to the localization data can look like the following example, and make use of a special HTML tag in the enclosing UI page.

```
<isinclude url="#URL(Action('ViewApplication-GetResourceBundle'),
Parameter('BundleName','js'),Parameter('l10ndebug',l10ndebug))#">
```

Developer 210 handles Java, using the LocaleHelper public API code class, takes special care with the bundle name, and provides parameters with a map, as listed next.

LocaleHelper.translateString("java_bc_catalog.Class", "key", "text")

In some cases, developer 210 can create a shortcut that handles tooltips in UI templates, via the ISMSG tag, providing the key for the tooltip. In some implementations, tooltips for attributes can come from the object definition. Sometimes developer 210 needs to add a note for the translator—for example, explaining what a parameter means. These comments get extracted and put into a readme.txt for the translators.

```
<ISMSG msg="user {0} " param0="#Name#" comment="0: first name">
l10n("d.f", "k", "user {0} ", name); // 0: first name
LocaleHelper.translateString(...); // 0: first name
0: first name
```

In one example use case, for a pre-existing application delivered via extensive web application that includes 1000 web pages, six developers may be required to work for two months each to markup text with approximately 180,000 keys; and with five QA testers working for five weeks to check to find resulting code breakages.

Continuing with FIG. 2, developer 210 stores marked-up code in platform code repository 102, and sends source code 222 to build tool 122 which uses the LiOn source code verification tool 124 to verify that the mark-up is correct, so that the extraction process can run successfully. L10n source code verification tool 124 accesses extractor 132 to extract resource bundles 225, which include extracted tags used to locate key name strings and marked-up translatables. In one example, extractor 132 can also verify, when performing the mark-up, that the translatables are extracted as intended—checking parameter handling during development of the application. In some implementations, a scan tool can be utilized to find text that was not extracted, thus identifying places which have not yet been marked up by developers, and so would remain in English when the respective localization kit is translated. Extraction is typically run after all code features for a release are completed.

Process owner 270 receives the extracted resource bundles as a preliminary localization kit with a directory structure that includes a "full" folder containing all properties files in their current state; a "new" folder with not-yet-translated strings; and a "changed" folder with files containing strings in which the source language has been updated since the previous final localization kit. In one implementation, the extracted preliminary localization kit label includes the date of extraction. The "full" folder includes all keys in all languages, and localization kits are independent of the code release as they only include language-related content. A developer can extract, for a specific code version, a localization kit that contains to-be-translated text for exactly this code version and complete the translation process to deliver a language pack, as long as the process owner has access to the previous localization kit. Resulting language packs can be used with multiple code versions.

As part of the initial mark-up of translatables, the key used for uniquely identifying a string needs to help the translator understand its linguistic context in the UI: knowing the type of UI element in which a string will be displayed allows the translators to choose the correct terminology, grammar variant (e.g. the infinitive, a full sentence, an imperative etc.) and punctuation. For example, translations of source text that is a "heading", "message" or "button" may differ in usage of upper and lower case and of active or passive style, and infinitive or imperative of a verb. In the 'button.new' key example, the bundle gives the context that it is, for example, a label on a button used for creating a new customer.

Key names show context in translator tools, and help human translators to minimize terminological and stylistic errors, so accurate names are required. The first element might signal where in the page the key appears, such as for table/table.header, followed by the key type, and then the identification. Different elements of the key are separated by dots. If one element consists of multiple words, developer 210 separates them by underscores, as for error.no_file, or uses CamelCase, as for error.NoFile—writing compound words or phrases such that each word or abbreviation in the middle of the phrase begins with a capital letter, with no intervening spaces or punctuation. Developers use a list of property key types with allowed keywords that match specific UI elements, including tabs, buttons, fields, breadcrumbs, errors and links. When a natural language string needs to be split into multiple parts, developers use the same key for all parts, and add a sequence number to the end of the key, so that when the resource bundles (also referred to as resource files) are sorted, the keys stay in order.

Figure 4A:
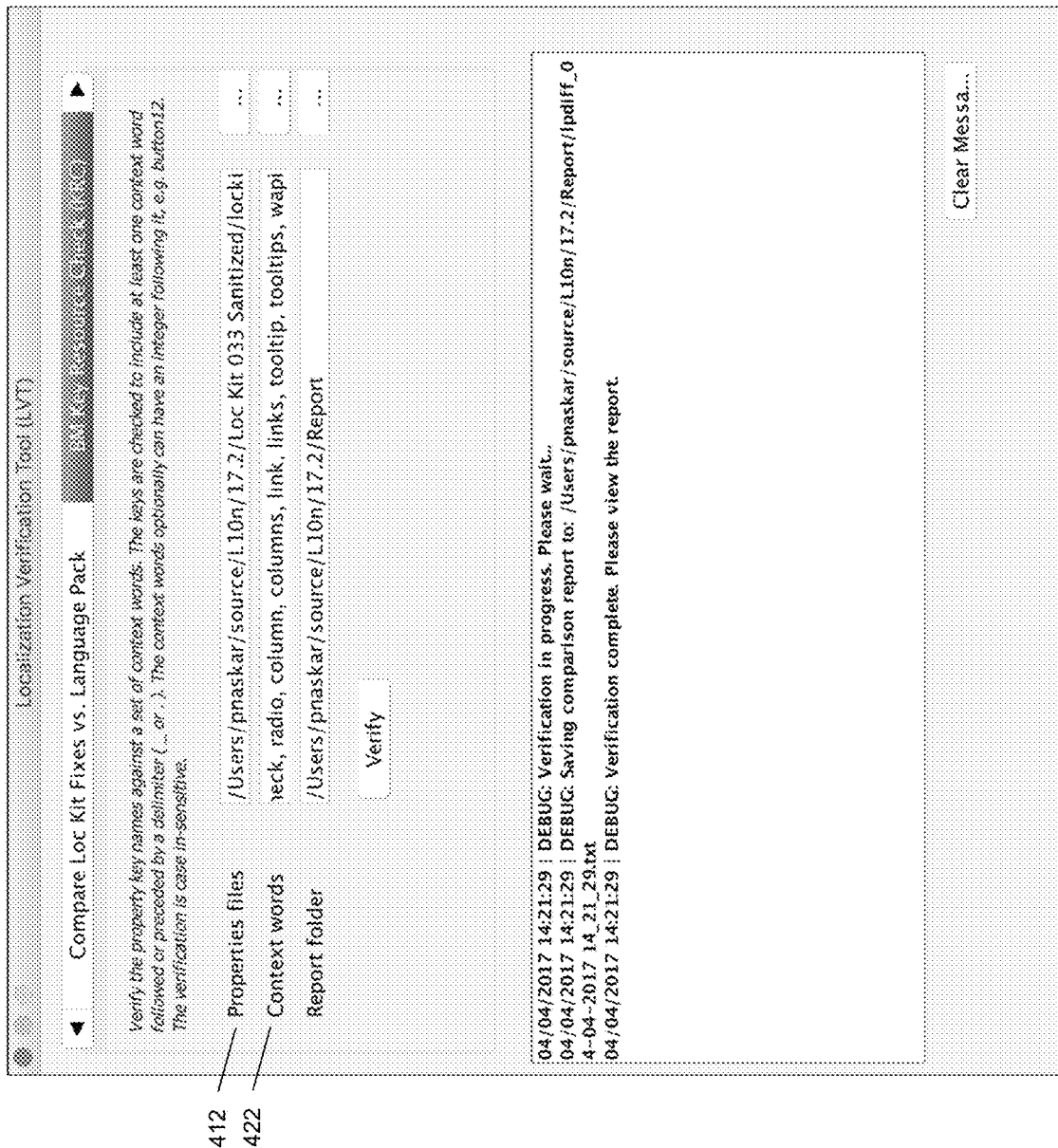
FIG. 4A shows an example UI for a key name verification tool for verifying the property key names against a set of context words that they must contain.

Process owner 270 sends the extracted bundles received from developer 210 to key resource checker (KRC) 158 via run KRC 226, to screen for the approximately twenty types of user interface (UI) elements and check whether key naming conventions—that is, the presence of defined keywords identifying the UI element correctly—are being adhered to by code developers, as shown in FIG. 4A and FIG. 4B and described infra. In one implementation, the extracted bundles are zipped before being sent. Input to KRC 158 includes the set of extracted properties files, including changed properties showing keys whose values have changed (i.e. the text strings in the source language) changed in the current release, and new properties for keys (i.e. newly added text in the source language) added in the current release.

KRC 158 includes a tag sanitization cleanup and exception generation tool set configurable to present keys in a preliminary localization kit to a human localization expert; run a tag name convention enforcement tool against the preliminary localization kit, which parses extracted keys and locates key name strings and translatable text (default and optionally original), then applies key naming rules that require presence of at least one approved keyword identifying the respective UI element where the text appears from a list of valid keywords and that require key uniqueness: either matching values or different keys. The tool is also configurable to create bug report stubs for completion by the human localization expert, including in the bug report stub context from a tag exception generated by applying the key naming rules to a parsed key name string and accepts additional comments from the human localization expert to include in a completed bug report, regarding the key name that triggered the exception. The tool can accept edits to the translatable text from the human localization expert; and generate sanitization correction files using the received key names and edited translatable text for processing by a developer. KRC 158 returns sanitization correction files 236 to process owner 270 who reviews the correction files and submits sanitization requests and submits bug reports 238. Process owner 270 forwards the sanitization for review and incorporation 234. Sanitization—that is, normalization of all new and changed strings—involves changing terminology, punctuation, spelling and style for adherence to the style guide and glossary as well as resolving potential localization problems, such as concatenations or order of parameters. Sanitization includes applying any needed escape sequences, such as for single or double quotes. In one implementation, program escape sequence rules can be included in the sanitization, as suggestions or automatic corrections.

Developer 210 reviews and incorporates 240 the sanitization results into platform code repository 102, merging the sanitized strings back into the master code to prepare the improved English source UI for release. Developer 210 sends the sanitized source code 242 to build tool 122 which uses lint to verify that the sanitized mark-up is correct. In some use cases, a QA review of the sanitizations may be performed if the scope of new content warrants it.

Figure 5:
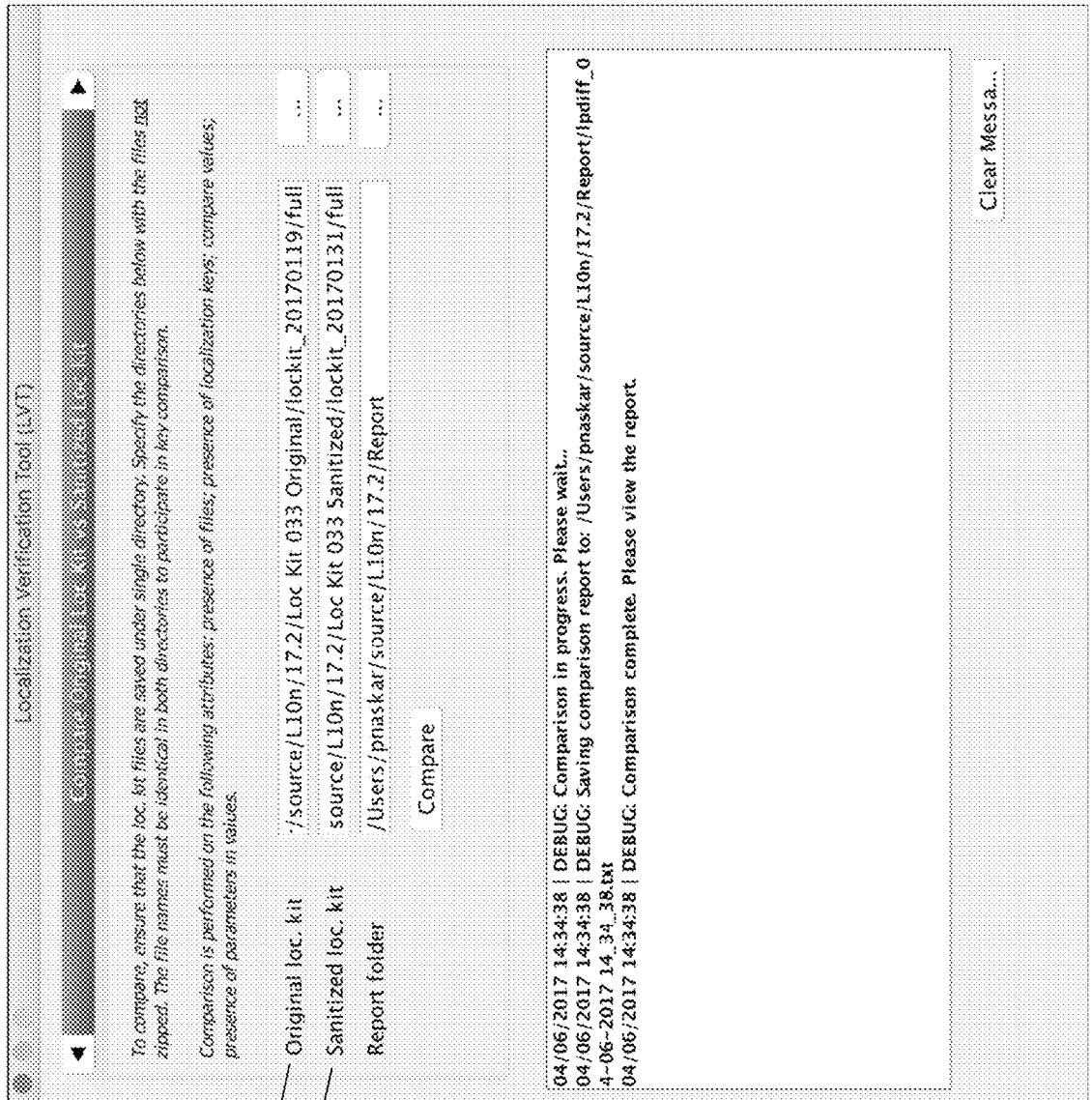
FIG. 5 shows an example post-merge sanitization check tool configurable to compare a sanitized localization kit into which the sanitization correction files have been merged, to the original (source) or preliminary localization kit.

Continuing with process of preparing a localization kit for translation by human translators depicted in FIG. 2, developer 210 extracts sanitized resource bundles 244 and process owner 270 sends the extracted sanitized bundles received from developer 210 to key resource checker (KRC) 158 via run KRC 246. In one implementation, the extracted sanitized bundles are zipped before being sent. KRC 158 returns a report of the corrections in the sanitized correction files 256 to process owner 270, who verifies sanitization changes have been incorporated 258. The process iterates: verifying sanitization 266, forwarding sanitization for review and incorporation 234, developer 210 review and incorporate 240. Keys that stayed the same are suppressed, and the developer merges these sanitizations. In some cases, a human QA expert must approve the request for the corrections to be merged into the release branch. Then the new and improved English is live in the production environment and the localization kit that gets pulled is a clean source for the translation. Process owner 270 receives a revised version of the localization kit and runs the KRC 246, leading to committing a final localization kit 276. Process owner 270 verifies sanitization using localization verification tool (LVT) 116 which includes post-merge sanitization check tool 118, configurable to compare kit versions using the preliminary localization kit and a sanitized localization kit, into which the sanitization correction files have been merged, as shown in FIG. 5, described infra. The LVT runs a change confirmation tool 117 that compares a selected preliminary localization kit with the sanitized localization kit that counts, compares and reports total numbers of files in the preliminary localization kit and the sanitized localization kit; compares and reports differences in key content between corresponding files in the preliminary localization kit and the sanitized localization kit; and compares and reports differences in parameters-in-values between corresponding files in the preliminary localization kit and the sanitized localization kit.

When the delta between the preliminary localization kit and the final localization kit matches the sanitizations that were handed back the localization kit is deemed ready to be translated. If some expected changes are not reported, the QA person investigates if there were merge conflicts that the developers ignored. Steps can be repeated 268 to resolve any errors. In one implementation, post-merge sanitization check tool 118 counts number of files in the full folder of the selected preliminary localization kit, counts number of files in the full folder the sanitized full localization kit, and compares the count of number of files in the full folder of the selected preliminary localization kit to the count of number of files in the full folder of the sanitized localization kit. The check tool also compares key content of each file in each folder (full, changed and new) in the selected preliminary localization kit to key content of a file with the same file name in a folder with the same folder name (full, changed and new) in the sanitized localization kit. The check tool additionally compares parameters-in-values across the files in the selected preliminary localization kit to parameters-in-values across the files in the sanitized localization kit; and generates a post-merge sanitization correction report that displays the results of comparing the count and content of files in the preliminary localization kit's full folder to the count and content of files in the sanitized localization kit's full folder; lists differences in keys by file name for each pair of same-name files compared in the full, changed and new folders in the preliminary localization kit and the full, changed and new folders in the sanitized localization kit; and lists differences in parameters-in-values, by folder name, in the full, changed and new folders in the preliminary localization kit and the full, changed and new folders in the sanitized localization kit.

Further continuing with FIG. 2, in some implementations, the process owner 270 iterates, with changes prompted by analysis or and response to results of running localization verification tool (LVT) 116. After the sanitized localization kit 266 has been verified, developer 210 commits the final localization kit (FLK) 276 to localization repository 105, and process owner 270 sends the final localization kit (FLK) 288 to human translators 280. In one implementation, translators receive a single zipped file with folders of key-value pairs to be translated. In other implementations, the localization kit can be packaged differently. The finalized localization kit gets run through a computer-aided translation tool (CAT) such as memoQ. In one implementation the CAT tool's translation memory tool is utilized to determine new, fuzzy-match and non-translatables for the target languages. In some use cases, a machine translation tool can be connected to the CAT so that a machine-translated (MT) draft could be prepared that is edited by human translators.

In another implementation, a different tool may be used to support human translators to complete the translations to multiple different languages. In one implementation, the localization kit can be translated from English to French, Japanese, German, Italian and Chinese. In another case, the kit can be translated to many other languages, using the disclosed methods and systems. In one example, a group of four translators, one for each of four languages, each work for a week to complete the translation into four languages, for a finalized localization kit.

Figure 3:
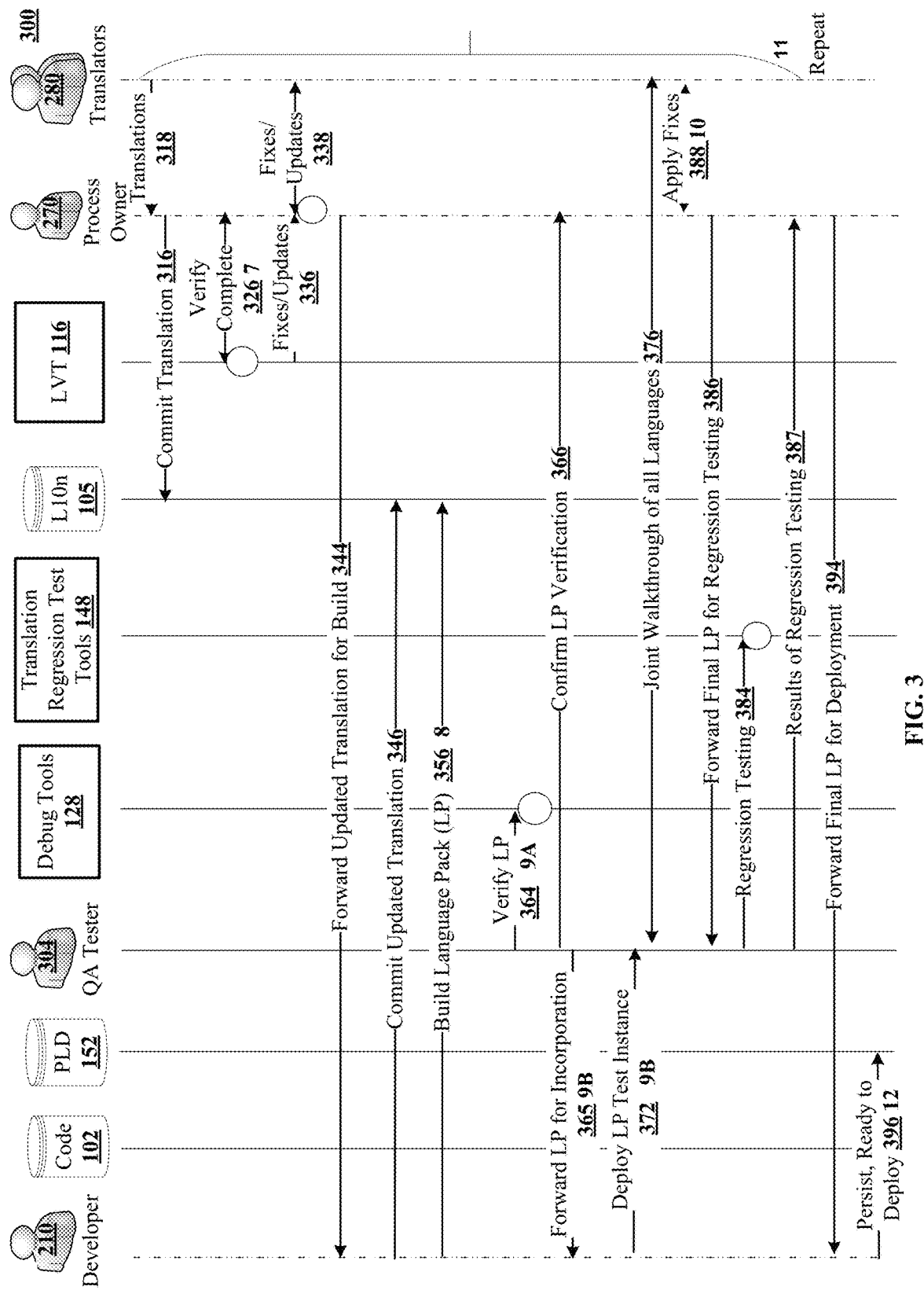
FIG. 3 shows an example message flow for receiving translations of a finalized localization kit from translators, completing quality assurance testing and verification, and deploying to production a language pack that includes multiple target language translations.

FIG. 3 shows an example workflow 300 for receiving translations 318 from translators 280, of a final localization kit, and completing quality assurance testing and verification that all files are included, and that all of the text has been converted to the designated language. Workflow 300 also includes production of a fully QA tested language pack that implements a full set of languages.

A human translator or translation project manager using translation tools and edits can introduce errors. For example, keys can be lost or corrupted, parameters can be lost or corrupted, encoding of files may be wrong, or escaping rules for certain characters may not have been adhered to.

Continuing with FIG. 3, process owner 270 commits translation 316 to localization repository 105 and sends the translated localization kit to localization verification tool (LVT) 116 to verify the translated kit is complete 326. LVT 116 validates, by automated tests in translation verification tool 119 which ensure that number of files is correct, that the number of keys in each properties file is correct, and that parameters are not broken, as described for FIG. 7 infra. Process owner 270 communicates fixes and updates 338 to translators 280 and tests further fixes and updates 336 of the file structure and content using localization verification tool (LVT) 116. Process owner 270 forwards the updated translation for build 344 to developer 210 who commits the fixed, updated translation 346 to localization repository 105 and builds language pack 356. QA tester 304 verifies the language pack 364 using debug tools 128, described in detail infra.

Figures 12A, 12B:
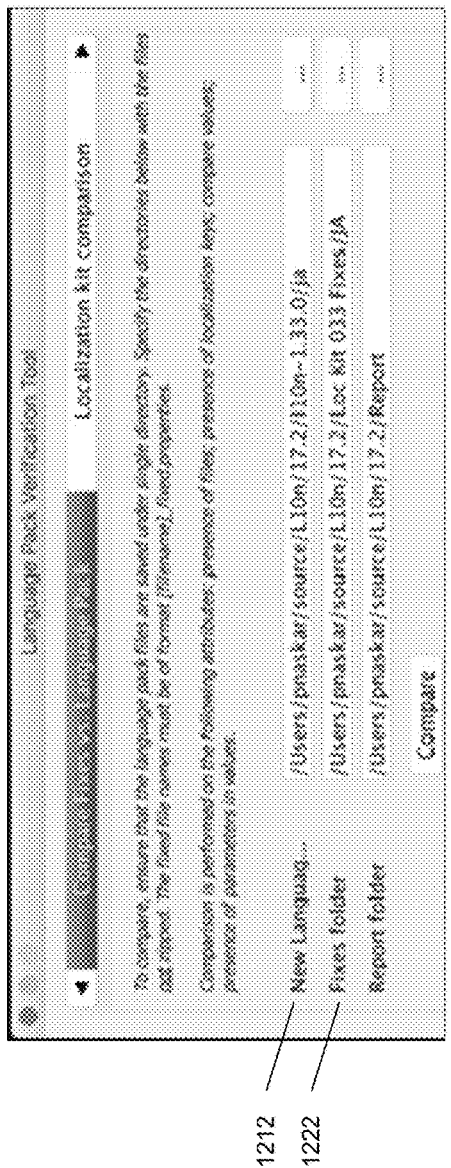
FIG. 12A displays a comparison tool UI for testing fixes of a localization kit delivered by the translators.
FIG. 12B shows an example report for the comparison of a translation into French, of a fixed localization kit.

Further continuing with the process described by FIG. 3, after validation by automated tools that the language pack matches the delivered translations, QA tester 304 confirms language pack (LP) verification 366 to process owner 270 and forwards the LP for incorporation 365 by developer 210 for testing in context in a test instance of the web application—by the translators, via a joint walkthrough of all translated languages 376 with translators 280 of the respective kits. Developer 210 deploys a language pack test instance 372 for QA tester 304, often a language expert, who prepares a test script based on new and changed strings. The test script leads translators to exact pages so everyone sees the UI in the source language and each translator views the version they translated. In one implementation, after discussion with QA tester 304, translators fix identified errors, and the translation company sends back an updated set of files. For some web application code, the engineering team must rebuild the entire code base even for language changes. In other implementations only the language pack gets rebuilt. A report that compares fixes to the current language pack is shown in FIG. 12A and FIG. 12B and described infra.

After testing of changed and new features, in context, for each language, and after coordinating with translators 280 to apply fixes 388 to the translated files, process owner 270 receives the fixed translations from translators 280 and forwards a final language pack 386 to QA tester 304 for regression testing 384. In one use case, an automated test confirms that every web panel in the web application displays in the foreign language. In one implementation, QA tester 304 performs regression testing 384—in some implementations, covering ten to fifteen percent of the translated web application. Translation regression test tools 148 iterate over changes to the web app panels, for the selected language, and generate web application context renderings for human visual inspection to verify that translated characters in translated text strings do not break the web app panels. In some cases, regression test tools 148 iterate over changes to the web app panels, for the selected language, and generate web-app-context renderings for machine inspection to verify that translated characters in translated text strings do not break the web app panels.

One tool runs automated tests to verify that all pages in the application web site can be reached by clicking on a menu. This verifies that the pages in the app are not rendered empty, but display in the chosen language. The automated in-context tests call a single core module which contains all test cases for all supported languages. The automated in-context verification tool uses specified language packs for each supported language for parameters. In one use case, the test logic gets run through a custom XLT module, by Xceptance, which looks at the specified language pack and its key value pairs, and navigates to the panel under test to find the UI element to verify. The test asserts that the obtained value, specified in language packs, matches the text in the UI element rendered on web page. The automated in-context test will fail if even one mismatch is found. Any exception or message gets written into a live log file. The automated in-context verification tests can be run locally on the tester's machine during the language pack qualification process or continuously during the development cycle in an integration environment. Language packs for each supported language can be specified in local jobs, which can be set to run at any time.

Figure 12C:
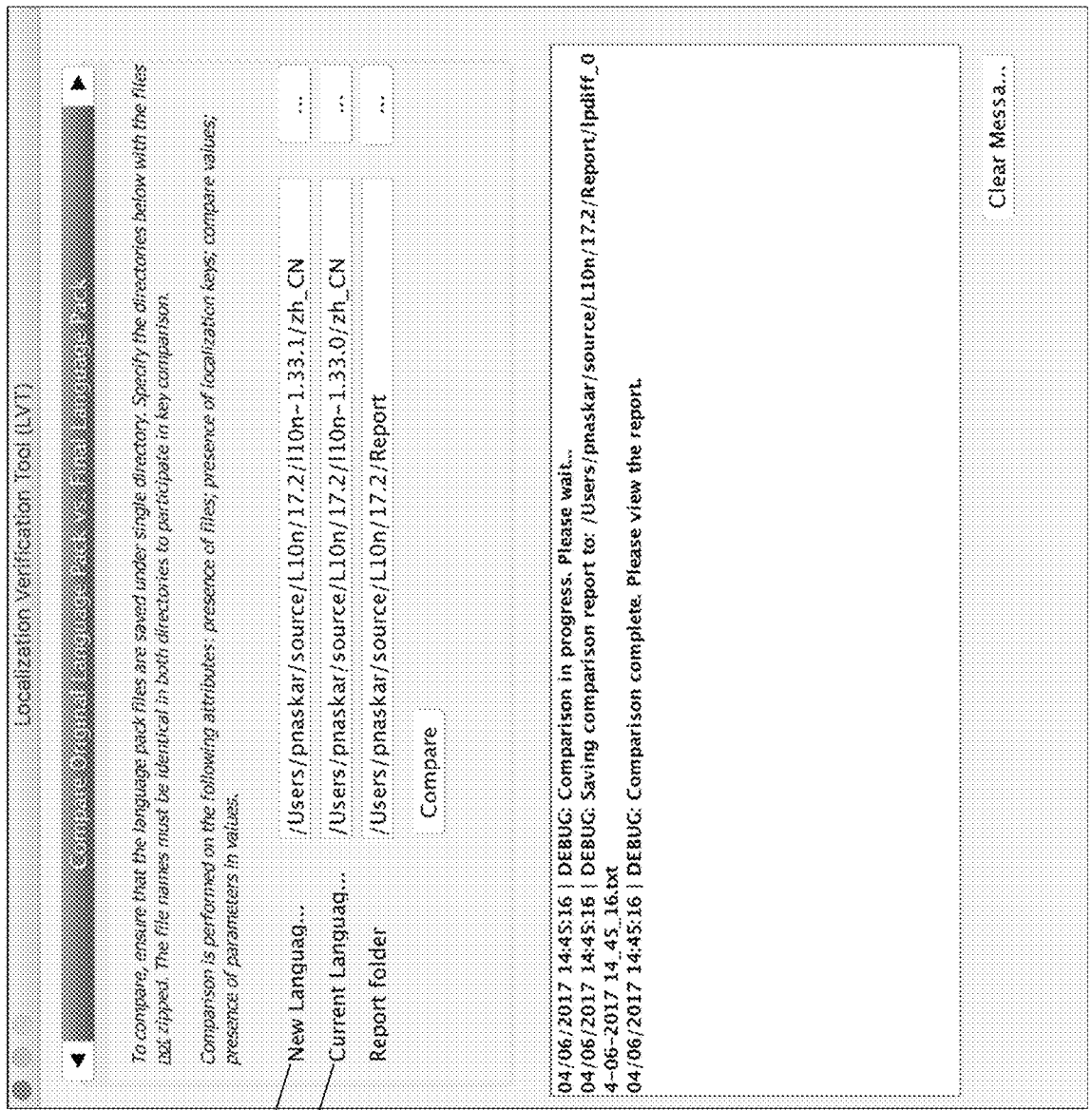
FIG. 12C shows a report UI for comparing a newly-built language pack to the original language pack.
Figure 12D:
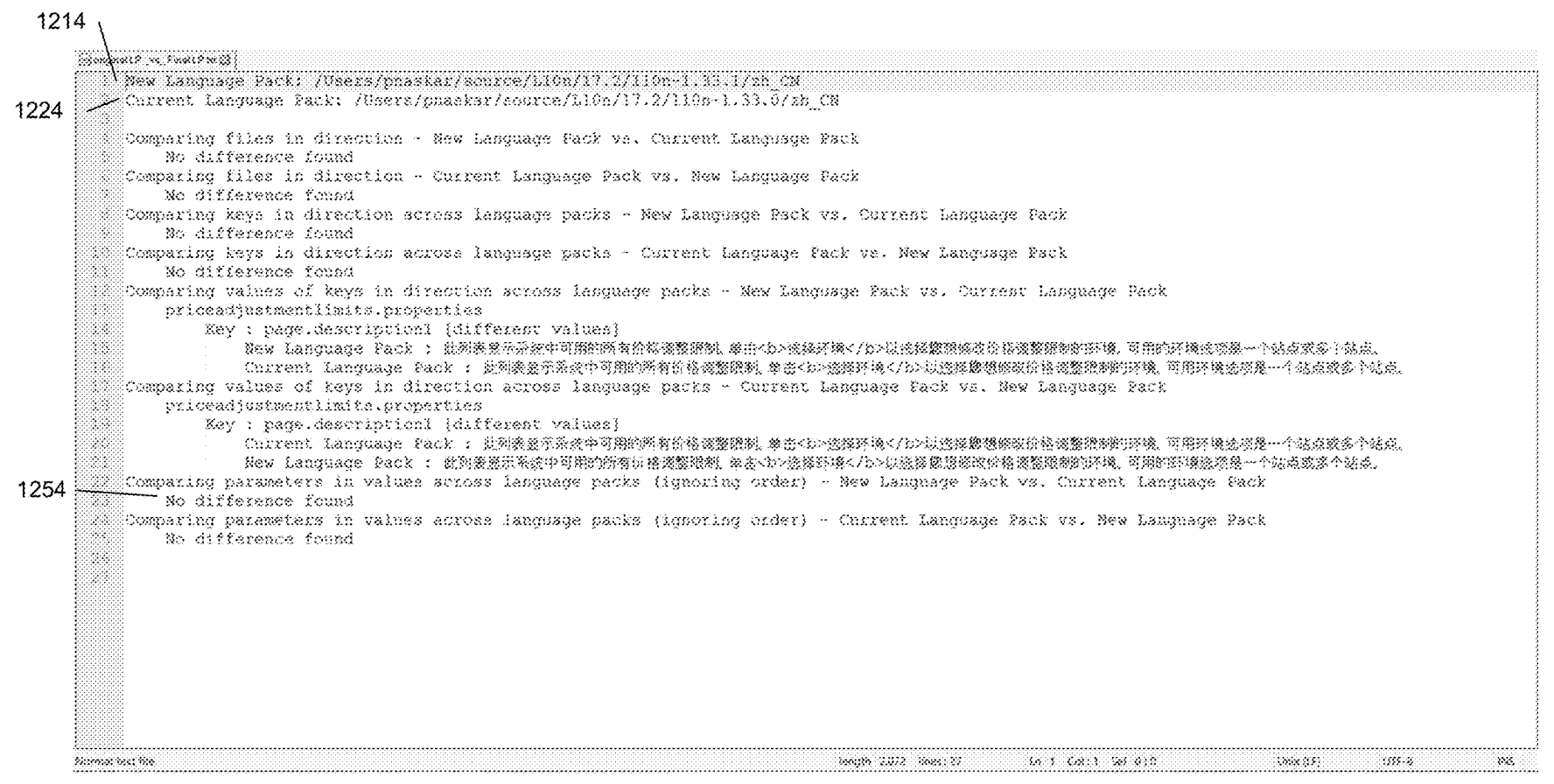

Continuing with the process shown in FIG. 3, results of regression testing 387 are forwarded to process owner 270, who applies fixes, validates the translated LP, and forwards the final language pack for deployment 394 to developer 210 who persists the finalized language pack 396 in production translation repository (PLD) 152, an object code repository usable for deploying language packs. Validation of the translated LP can include running a report that compares the new language pack to the original language pack, as shown in FIG. 12C and FIG. 12D and described infra. In one implementation, an automated system adds version information before adding the files to PLD 152, from which they can be deployed. Process owner 270 notifies the operations team that the language pack is ready for deployment to production machines. In one implementation, when automated verification of the resource files that compose the LP is complete, they are once more deployed to a dedicated test instance for this release but also to a test instance from the most recent global release XX.x−1 to check backward compatibility, because the globally applied language pack—when deployed to preview instances of global release XX.x of the platform, will be utilized also on the XX.x−1 production instances on the same POD. For some implementations, QA tester 304 completes additional spot-checking for regressions. Deployed language packs are also committed to the source control system for the application code, in many implementations. In one example implementation for translations of a web application to four languages, one language pack includes all four languages as four zipped files, which get deployed to the test instance, and after testing is complete get committed to the source code repository.

FIG. 4A shows an example key resource checker (KRC) 158—a key name verification tool for verifying the property key names against a set of words identifying UI elements 422, which are allowed key words entered as comma separated text. In this example, the tool tests the properties files in the "changed" folder 412. FIG. 4B shows the report generated by running the report shown in FIG. 4A on the property files in the changed folder. In the report example, key:customerCdnshelp.2.1.2 476 is listed at not being a permitted key type. The QA tester 304 can use this information to complete a bug report to ask the developer to rename these keys, because localization experts and translators need to know by the key name, whether a key points to a column, a radio button, a title, an error message a button, or other element, so they can choose the right grammatical style and terminology when translating, as well as locate the respective UI element on the page when testing in context. The bug report stub context is from a tag exception generated by applying the key naming rules to a parsed key name string and the human localization expert can add additional comments regarding the key name that triggered the exception. In the example shown, the bug report can be routed to the content development network team (Cdns). In some cases, the developer has access to key resources tools. In some implementations, interim translation will proceed using the faulty key name to avoid slowing down delivery of a new release of an app, and in the next release the developers will have responded to the bug report, so that the code is improved and the key is more descriptive.

FIG. 5 shows an example localization verification tool (LVT) 116 that includes post-merge sanitization check tool 118 interface configurable to compare the new localization kit version 512—a sanitized localization kit into which the sanitization correction files have been merged, to the original or preliminary localization kit 522. In the example, 2017-01-19full includes the extracted ISMSG tags that the human localization expert performing a text normalization or sanitization worked on. The human localization expert finished sanitization on 2017-1-30 and a merge was performed to insert the sanitized code into an updated codebase. Then an extract was performed to generate a final localization kit against which a comparison can be run.

The report 600, shown in FIG. 6A, makes it possible for the QA tester 304 to manually compare reported applications of sanitization to intended changes, looking at two documents at time: the report and each of the sanitization files submitted for merge. In one example, twenty sanitization files are submitted for merge. In some implementations the comparison can be automated. Different results follow from comparison of different versions of the localization kit. For instance, a user can select the New, Changed, or Full extractions against which to run comparisons. The example report 600 shows the results for comparing original kit FULL 612 and sanitized kit FULL 622, showing where the results are the same and where they are not the same. The sanitized kit contents should match what was sent back to development, confirming that changes have been incorporated by the engineering team of developers. Three key messages show keys with different values because a period has been added to the end of the sentences 652. Several key messages 662 appear because single quotes are not found, resulting in "different values" messages in report 600 because the developer changed two single quotes to one double quote. The report only shows differences between original full and sanitized full. In one implementation, additional programming can automatically check that all of the keys in the sanitization file have been updated.

Figures 6B, 6C, 6D:
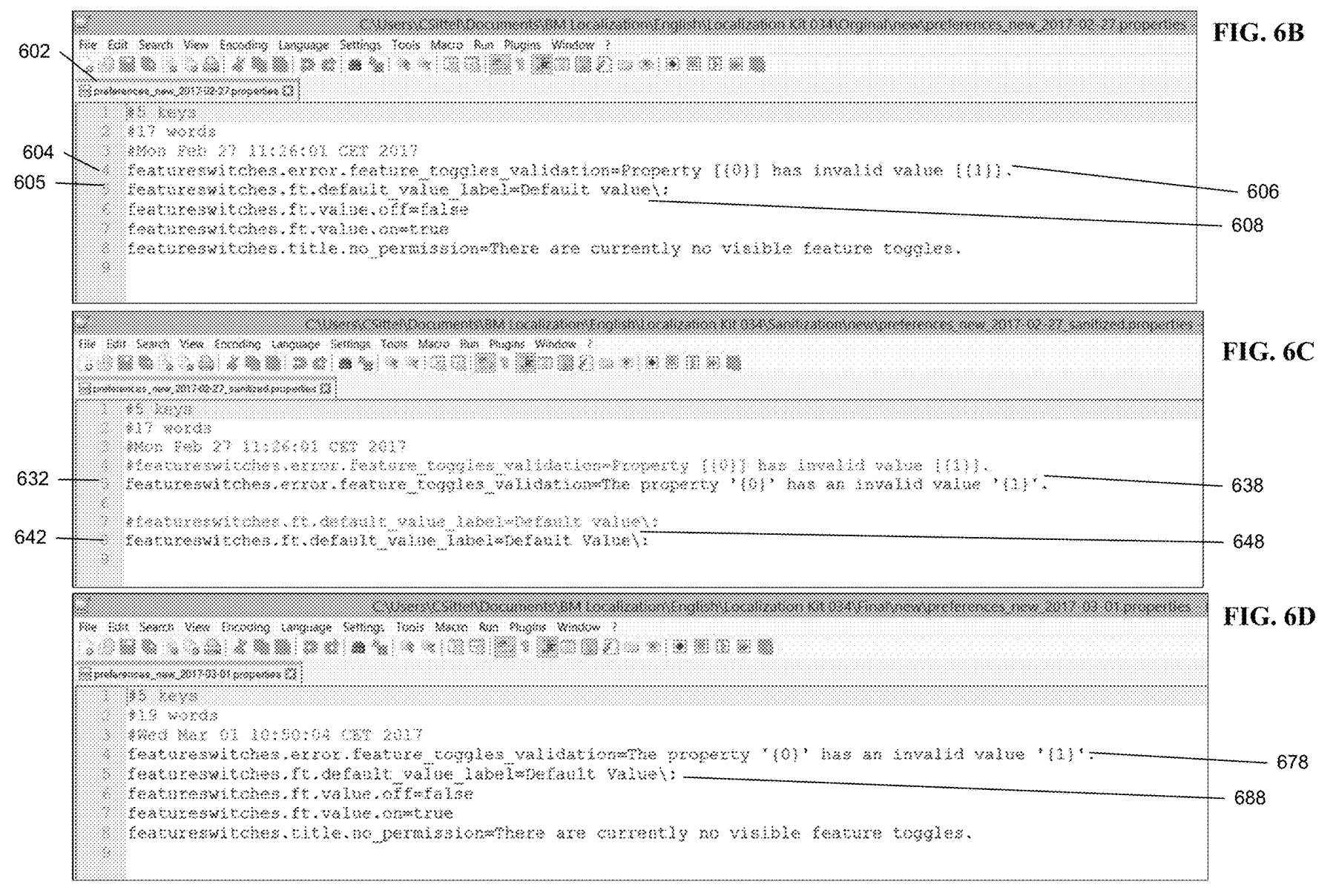

FIG. 6B shows an example sanitization correction file before corrections have been applied. In this example, for preferences_new_2017-02-27.properties bundle 602, brackets 606 are used and need to be replaced with apostrophes in line 4 604. Additionally, in line 5 605, the word value 608 needs to be capitalized. FIG. 6C shows the changes to be applied to correct the errors—that is, the sanitized properties. Line 4 is commented out, and line 5 632 is added to replace line 4, to replace the brackets with apostrophes 638. Line 7 is commented out and replaced with line 8 642, to replace the lower case v in 'value' with an upper case V 648. FIG. 6D shows the key-value pairs after sanitization: the apostrophes 678 and the word 'Value' 688 are represented correctly in the sanitized version of the localization kit.

Figure 7A:
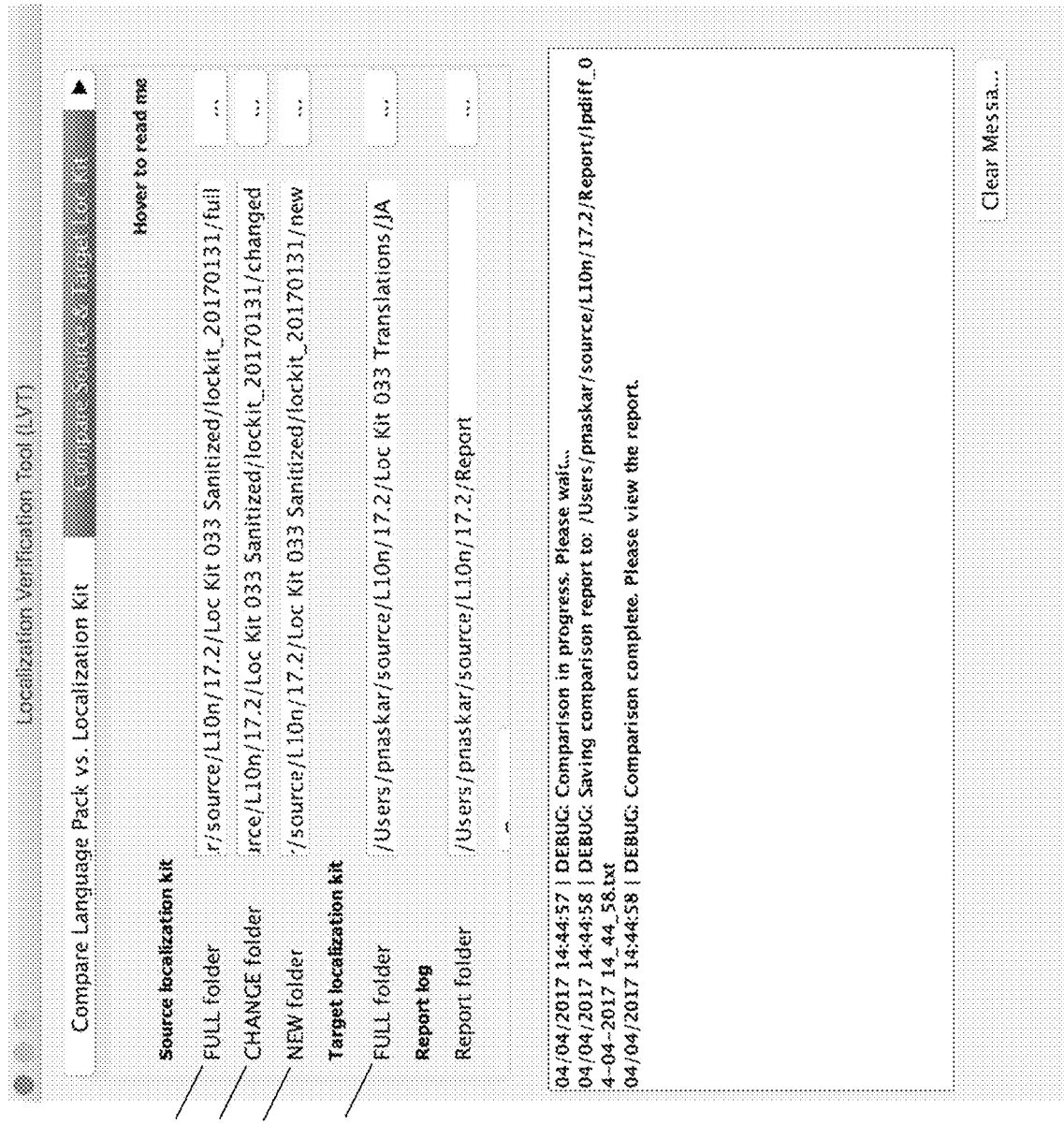
FIG. 7A shows an example post-merge sanitization check tool configurable to compare the sanitized source localization kit with a localization kit translated into a target language and delivered by a translator.

FIG. 7A shows an example comparison of source and target localization kits via localization verification tool (LVT) 116 that includes post-merge sanitization check tool 118 and translation verification tool 119. LVT is configurable to compare the sanitized localization kit full 712, changed 722 and new 732 with the target localization kit 742 provided by the translator. In one implementation, localization verification tool 119 can forward a final localization kit to a human translator that includes extracted tags that have at least a key name and a translatable text string in a source language; and receive a translated kit from the human translator that includes the extracted tags that have an added or replaced translated text string and present the translated kit to a human localization expert. Translation verification tool 119 runs a change confirmation tool that compares the translated target localization kits with the final source localization kit that counts, compares and reports total numbers of files in the translated kits with the final source localization kit; compares and reports differences in key content between corresponding files in the translated kit with the final localization kit; and compares and reports differences in parameters-in-values between corresponding files in the translated kit with the final localization kit; accept edits to the translatable text from the human localization expert; and commits a final translated kit to persistent storage.

FIG. 7B shows a report of results of running the tool shown in FIG. 7A, showing four fewer files in target 765. In this case, the localization process owner intentionally asked to suppress four files they did not want translators to work on yet—for new features under development. In one use case, error messages are displayed in English only, because no error codes are translated, and messages use single quotes for reasons intrinsic to the API: double single quotes are rendered as a double quote, a character that would break the code. The tool also can check code placeholders where values get pulled in, to ensure that no code was corrupted by the translation. The report in FIG. 7B shows results with no differences found 776 between what was sent and what was received back, which is the desired result.

Translation verification tool 119 can iterate over forwarding a revised version of the final localization kit, receiving a revised version of the translated kit, running the change confirmation tool and accepting edits to the translatable text, leading to the committing of a final translated kit. In some implementations, the final localization kit and the translated kit, include separate folders: a full folder of a full set of extractions from the code base; a changed folder of extractions of tags that changed after a prior extraction from the code base; and a new folder of extractions of tags that were not present on the code base when the prior extraction took place.

Figure 8:
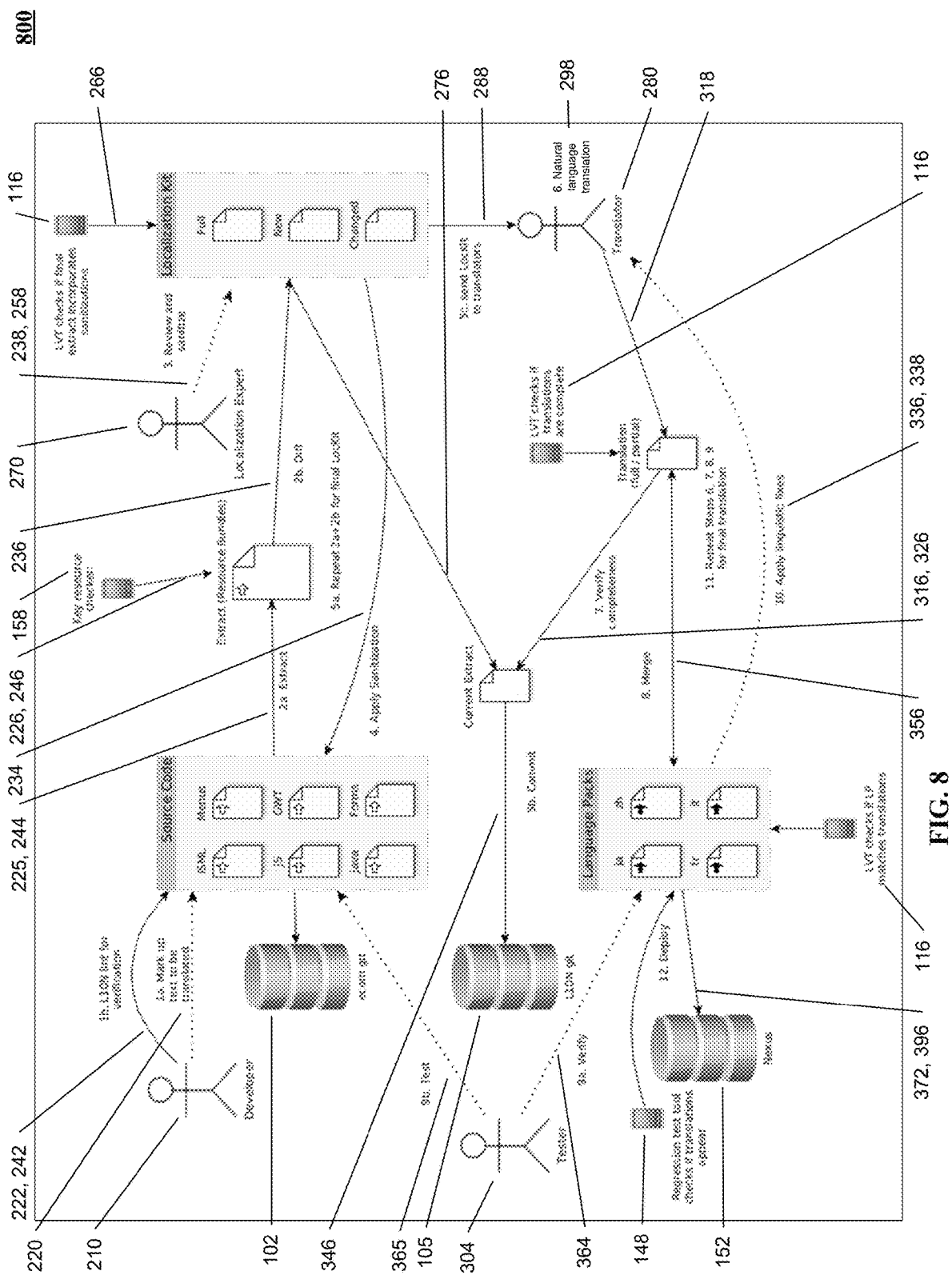
FIG. 8 shows an overview of the process for accurately translating elements of a web application into multiple languages.

FIG. 8 shows an overview of the process for accurately translating elements of a web site into multiple languages, and delivering language packs to production servers for production use—as shown in the workflows of FIG. 2 and FIG. 3 and described in detail supra. Customers of an app are able to see the language pack contents. Time stamps, date stamps, and currency can be different for different locales. In one implementation, folders of bundled files include one set of files per locale; in one example, German locales include Austria, Liechtenstein, and Luxembourg.

Language packs can be deployed independent of code. To ensure that keys that are no longer in use do not get deleted, the language pack merges the newly translated language packs with the previously deployed language packs. That is, a key that is no longer needed for translation may still be in the code, and translations cannot be allowed to break the code that delivers the application. In one example, in French all words should be translated, except perhaps the company name. In contrast, in Italian many English words are used, e.g. ok. In another example, Japanese transliterates English words sometimes, using the closest corresponding letters of their alphabet.

Figure 9B:
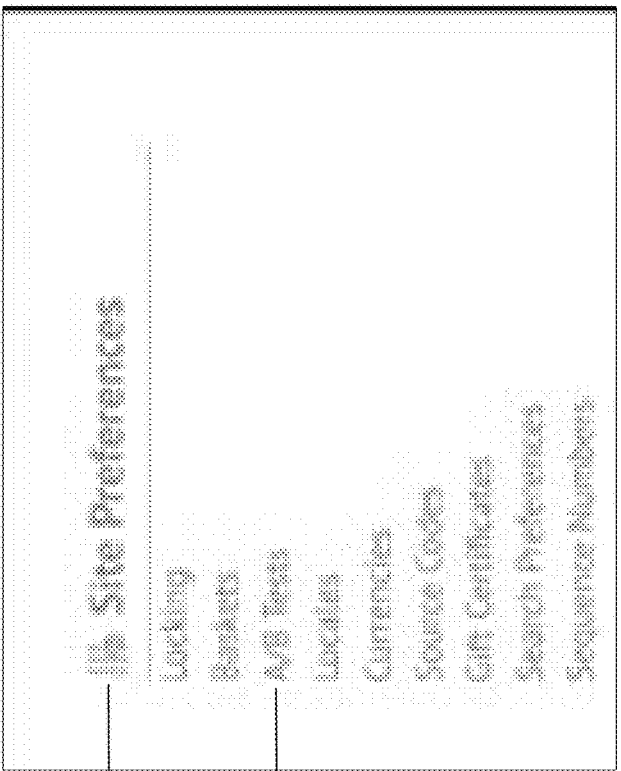
FIG. 9B shows a UI segment visible after selection of the Site Preference module in the US segment of the web application in FIG. 9A.
Figure 9D:
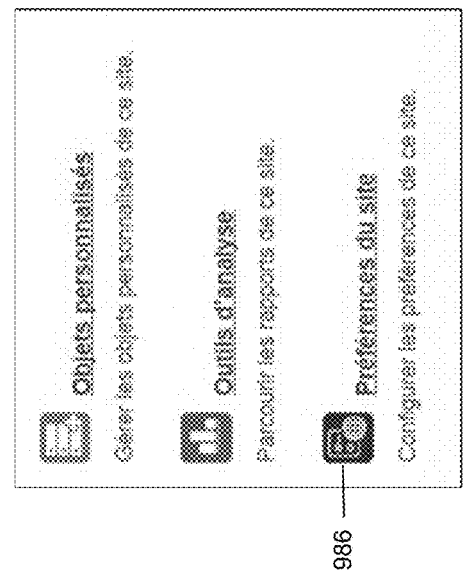
FIG. 9D shows the example UI from the web application of FIG. 9A, after translation into the French language.
Figure 9A:
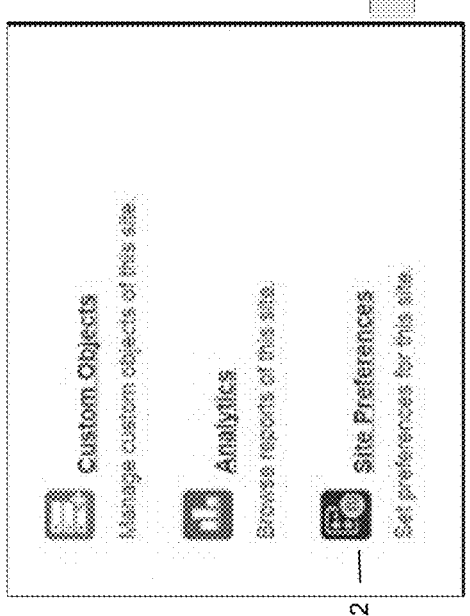
FIG. 9A shows an example user interface (UI) segment of elements to be translated.
Figure 9C:
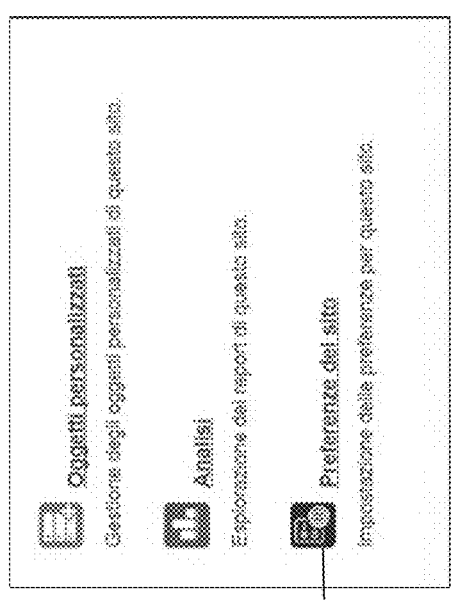
FIG. 9C shows the example UI segment of FIG. 9A, after translation into Italian language.
Figure 10A:
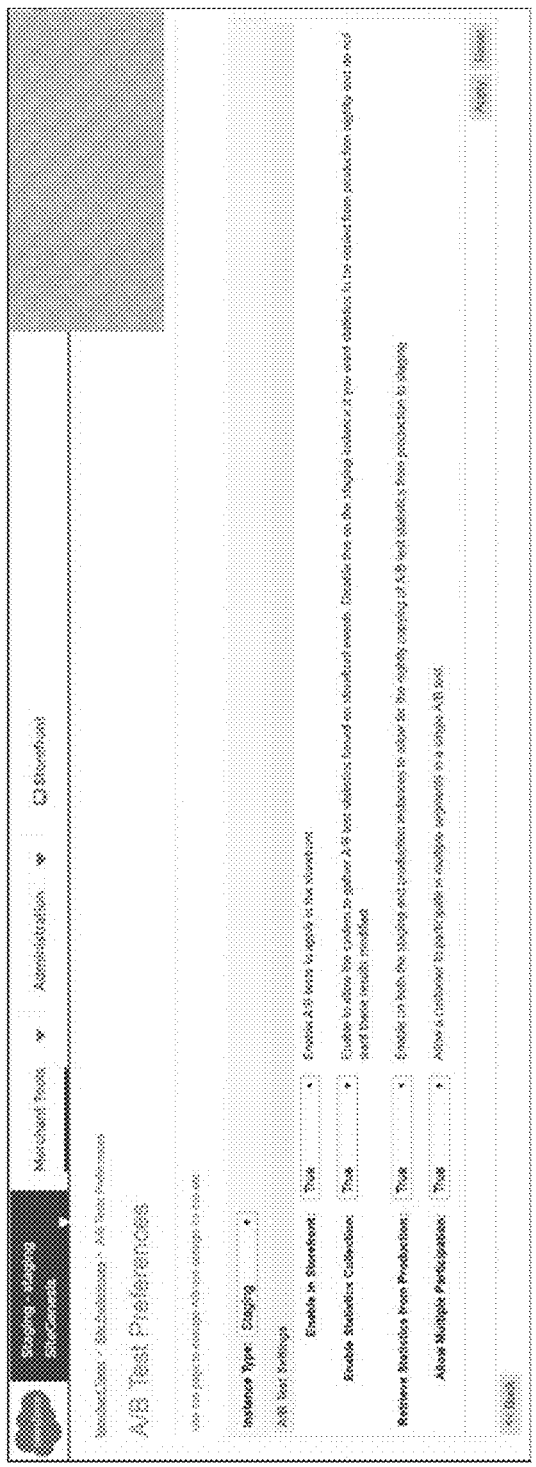
FIG. 10A shows an example A/B site preferences module from the web application displayed in English.
Figure 10B:
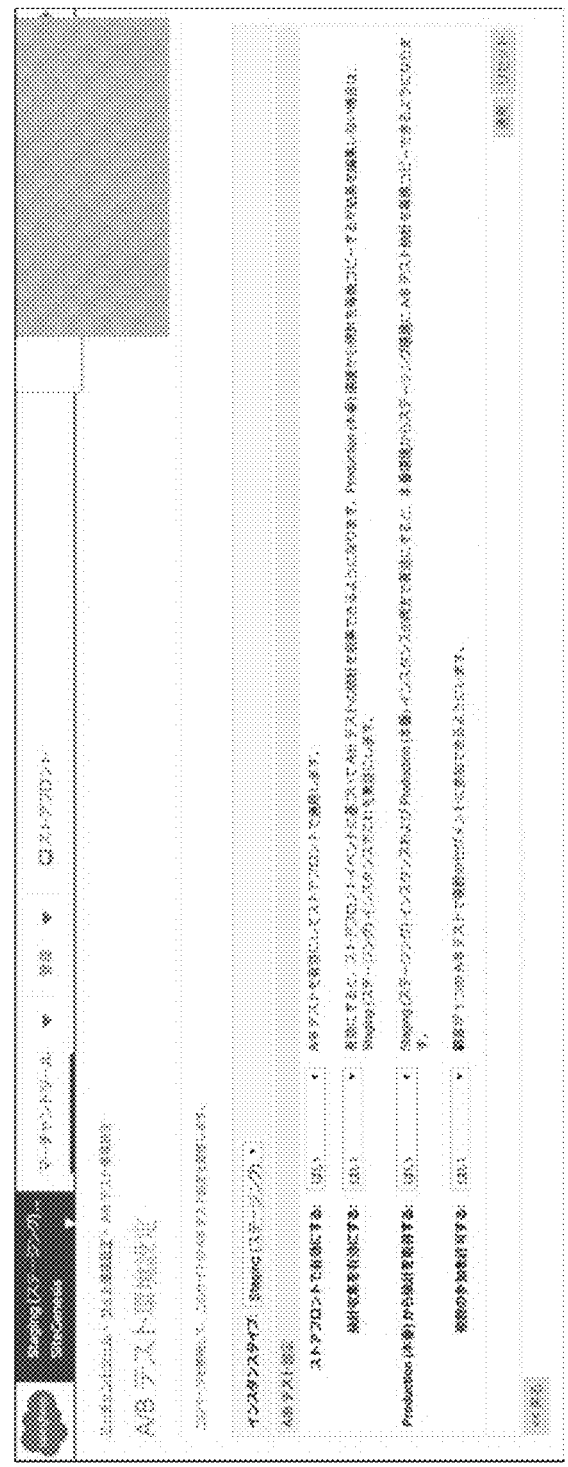
FIG. 10B shows A/B site preferences translated into Japanese.

An example app interface page that needs to be translated into multiple languages is described next. FIG. 9A shows an example user interface (UI) segment of elements to be translated, including Site Preferences 942. FIG. 9B displays the UI segment of Site Preferences 926 which includes A/B Tests 936, visible after selection of Site Preferences 942 in FIG. 9A. FIG. 9C displays, in Italian, the example UI segment of FIG. 9A, including "Preferenze del situ" 982. FIG. 9D shows the example UI segment of FIG. 9A, after translation into the French language, "Preferences du site" 986. FIG. 10A displays the UI content visible after selection of A/B tests 936 in Site Preference 926, and FIG. 10B displays A/B test site preferences translated into Japanese.

Figure 11A:
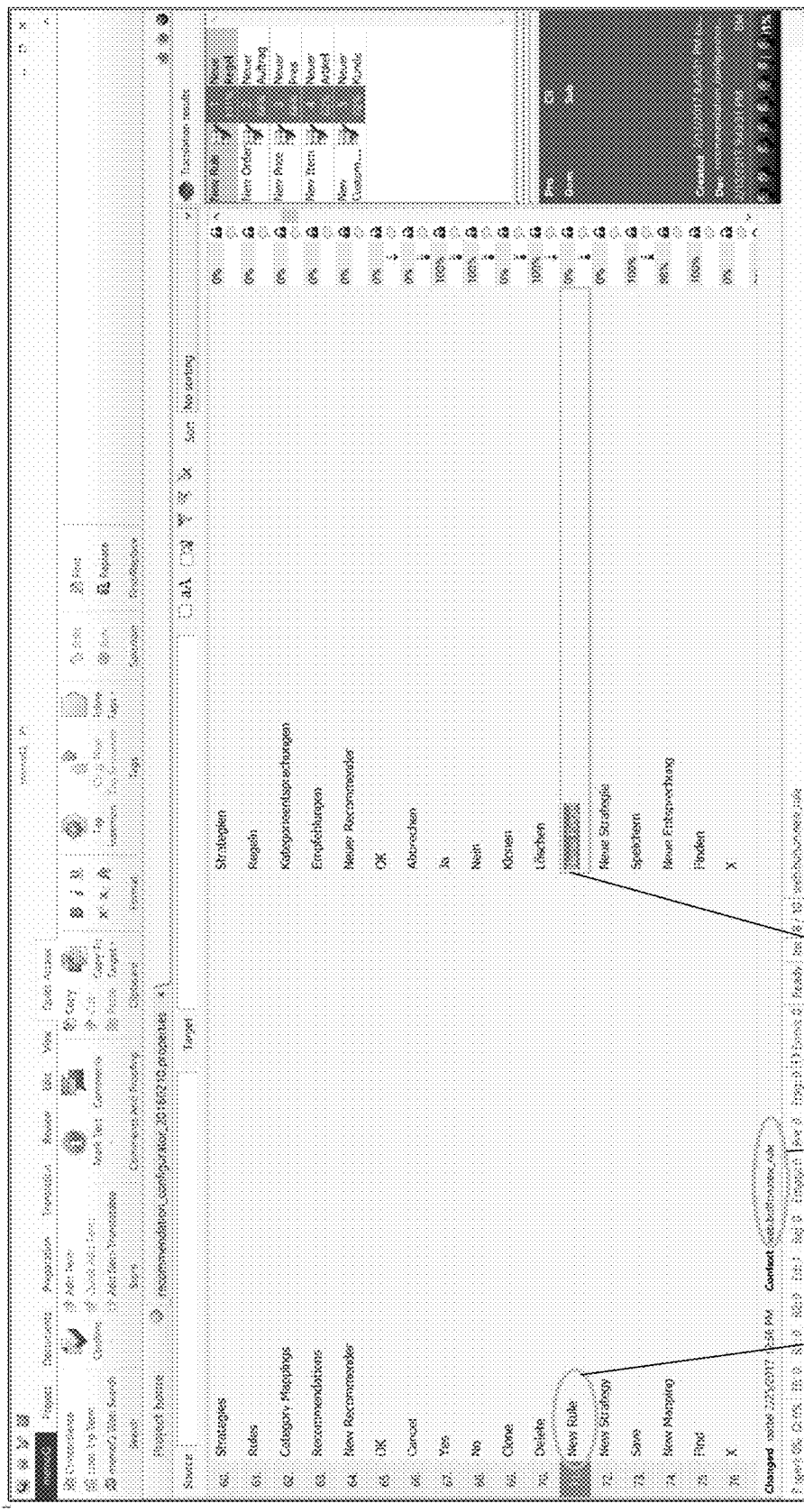
FIG. 11A displays an example use of unique keys to identify the contextual location of a text string that is being translated in a computer-aided translation tool (CAT).
Figure 11B:
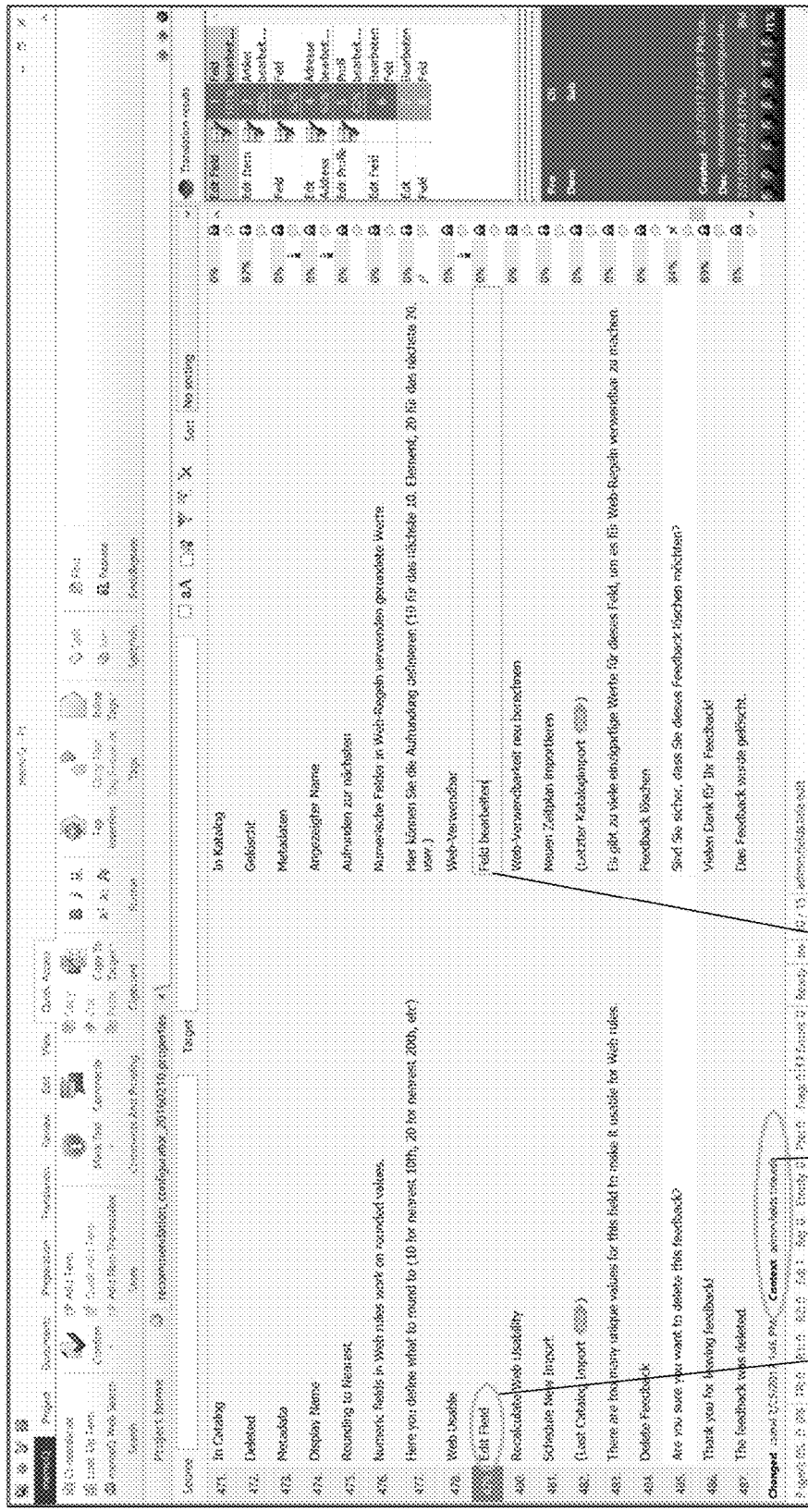
FIG. 11B shows a second example of keys to identify the contextual location of a text string that is being translated in a CAT.

Translators use commercially available tools to support translation actions. In one implementation memoQ is usable by translators, who can use the disclosed technology to view key names that identify the location on the web panel in the app being translated to unambiguously identify the text string to be translated in the application UI. FIG. 11A and FIG. 11B show examples of the power of keys: the unique keys show translators the context of each text string. In the example shown in FIG. 11A, web.button.new_rule 1144 gives information about where the text to be translated is located, supporting the translator in fixing the correct string. The text string on line 71 is listed in English 1122 and a translation into German 1126 in this example. In the example shown in FIG. 11B, When line 479 gets selected for review, admin.fields.title.edit 1154 gives location information for the text to be translated, to facilitate fixing the correct string. The text string is listed both in source language English 1132 and in target language German 1136. In another implementation, the human translator may utilize a different commercially available tool, such as Trados as the computer-assisted translation software suite.

After discussion by the translators 280 and QA tester 304 during the joint walkthrough 376, translators fix identified errors, and the translation company sends back an updated set of "fixed" files. FIG. 12A shows a UI for setting up the comparison of translated localization kit fixes 1222 to an existing language pack 1212. The localization kit files are persisted and the directory in which the files are persisted is specified. The comparison considers the presence of files, the presence of keys, a comparison of values and the presence of expected parameters in values. FIG. 12B shows a fixes comparison report for a French translation, with an example key for menu.actio.site-prefs_search.name having fixed accent marks 1252.

The LVT includes a tool for comparing the original language pack to the final language pack, after all fixes have been completed. FIG. 12C shows a report UI for comparing a newly-built language pack 1215 to the original language pack 1225 and FIG. 12D shows an example report resulting from the comparison on an original Chinese language pack 1224 to the new Chinese language pack 1214. FIG. 12D shows a difference 1254 between the original LP for Chinese and the final LP. One string does not match. In one case, this may be because the final LP absorbed a fix that the translator made after in-context testing or because of a build error. The QA tester who runs the tool makes the determination as to whether this difference between the LPs is expected as a desired linguistic fix or whether it may be a build defect. The comparison of parameters give a "no differences found" message 1264 in cases in which the parameters in the packs are the same.

In one implementation, the disclosed technology can include a live-edit-mode for translators, usable to capture any edits translators complete locally in the application server that runs the test session. When the test session is finished, all captured changes can be exported and then imported into memoQ or another computer-assisted translation software suite.

Debug tools 128 include a verification-in-context tool that supports debugging of a language pack that holds translations of text, which was extracted in source language tags from web app panels, the translations proceeding from a source language into multiple target languages, and translated target language tags logically or physically merged back into the web app panels from which they were extracted. The verification-in-context tool is configurable to audit web app panels to verify translation into a selected target language by identifying text, on a web app panel, which renders in the web app panel, determining whether each identified text was contained in a source language tag that was extractable for translation, determining whether processing of each source language tag produced a target language tag that was merged, logically or physically, back into the web app panel after translation, and providing access, linking instances of identified text that were merged back into the web app panel after translation, and supplemental source tag information that was present in respective source language tags before translation.

Figure 14A:
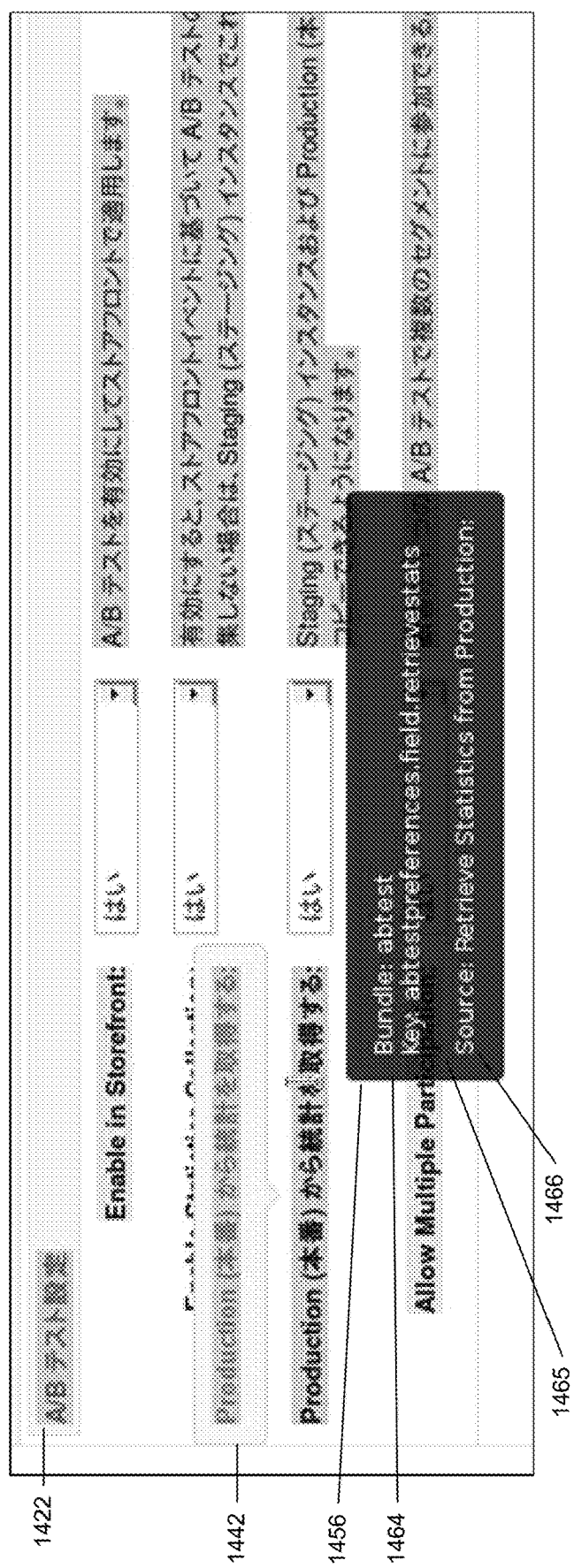
FIG. 14A shows a view, of the debug mode panel shown in FIG. 13, which displays supplemental source tag information.

FIG. 13 shows one implementation of debug mode, for a translation into Japanese. The verification-in-context tool causes display of web app panels in the selected target language, with each web app panel encoded to visually indicate, when viewed, which identified text on the web app panel was not extracted 1334; which extracted text was not translated 1324, 1354; and which extracted text was merged back into the web app panel after translation 1344. FIG. 14A shows another view of the debug mode panel shown in FIG. 13, which displays supplemental source tag information 1456 for extracted text merged back into the web app panel after translation 1344. In some implementations of debug mode, the user can hover over a text string of interest 1442 on the web app panel, and supplemental source tag information gets displayed: a bundle abtest 1464 to which the source language tag belongs, a key name abtestpreferences.field.retrievestats assigned to the source language tag 1465—, and translatable text in the source language 1466— "Retrieve Statistics from Production". In debug mode, translators can confirm that they are manipulating the intended string by viewing the key name of the string in their CAT tool. In yet another use case, debug mode can include markup of text strings that have been extracted, so that text that has not yet been extracted becomes more obvious. In some implementations, debug mode can show key names without the need to hover over a string of text.

Figure 14B:
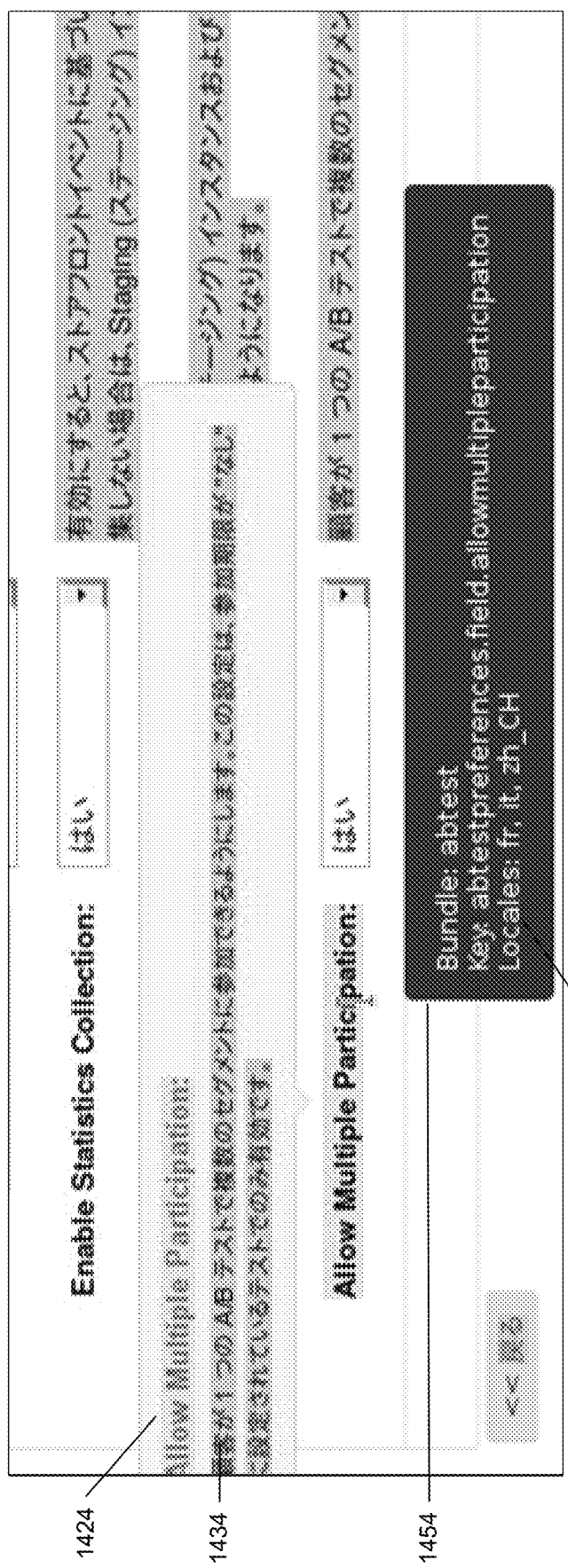
FIG. 14B shows a help screen usable during walkthroughs by a QA tester and multiple human translators, in one implementation.

FIG. 14B shows a help screen usable during walkthroughs by a QA tester and multiple human translators, in one implementation. The 'allow multiple participation' label 1424 was extracted but does not display as translated, and the translated text 1434 is included as helpful text to inform the translators. Popup text 1434 belongs to the web page, and is a help text referring to text label 1424. This popup has, as a title, the name of the label, and then the help text. As part of the application this help text popup is also handled by the debug mode so extracted and translated text as visually identified. The supplemental source tag information 1454 shows the languages for which a translation exists 1464—three languages for this language pack.

Workflow

Figure 15:
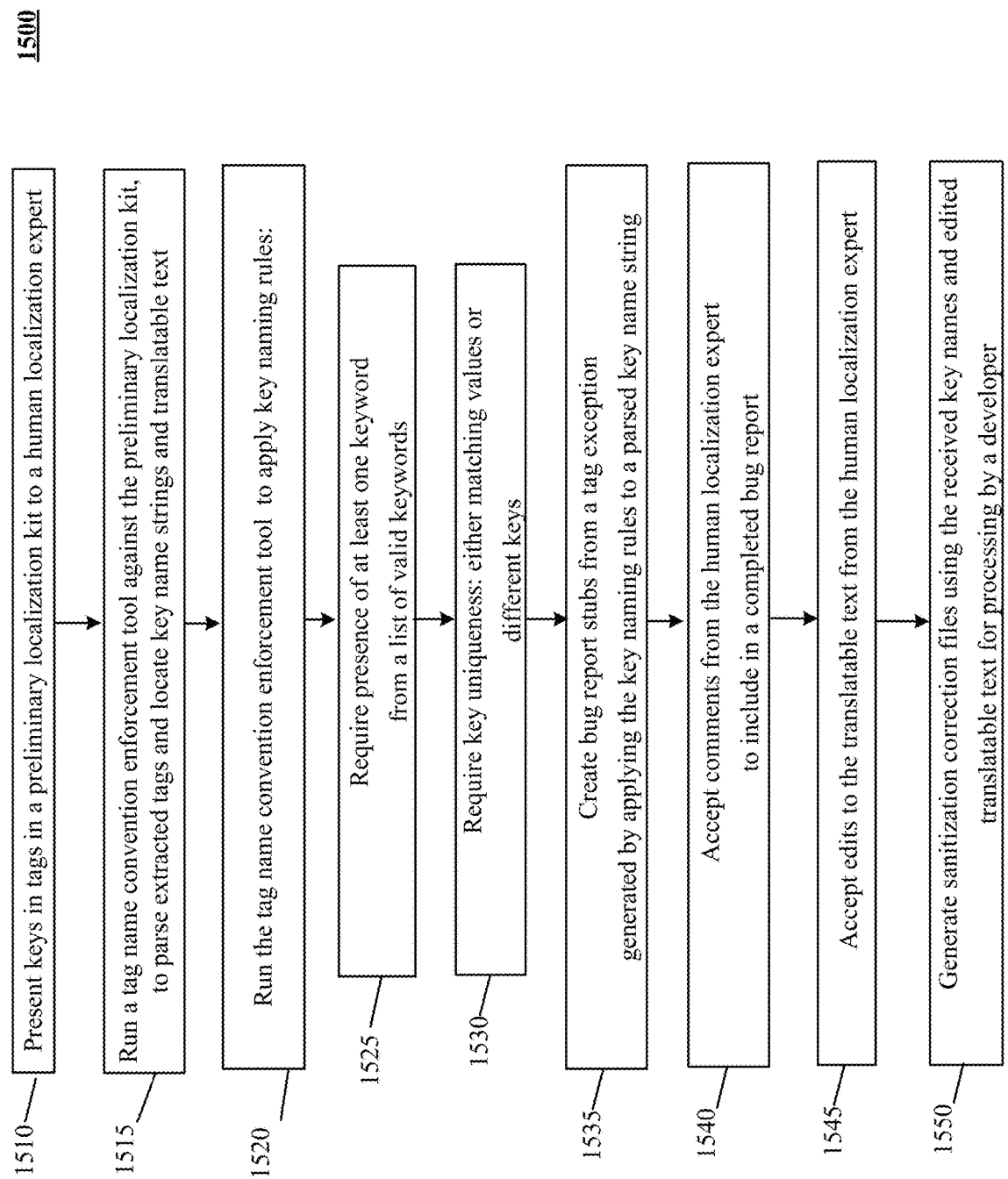
FIG. 15 is an example workflow of one implementation of an environment for accurately translating elements of a web application.

FIG. 15 is a flowchart 1500 of one implementation of an environment for accurately translating elements in a web application, adapting internationalized software for a specific region or language by adding locale-specific components and translating text. Flowchart 1500 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 15. Multiple actions can be combined in some implementations. For convenience, this flowchart is described with reference to a method.

At action 1510, present keys in a preliminary localization kit to a human localization expert.

At action 1515, run a tag name convention enforcement tool against the preliminary localization kit, to parse extracted keys and locate key name strings and translatable text, and at action 1520, apply key naming rules.

At action 1525, require presence of at least one keyword from a list of valid keywords to assure meaningful and consistent naming of the keys.

At action 1530, require key uniqueness: either matching values or different keys.

At action 1535, create bug report stubs for completion by the human localization expert, including in the bug report stub context from a key exception generated by applying the key naming rules to a parsed key name string and at action 1540 accept additional comments from the human localization expert to include in a completed bug report, regarding the key name that triggered the exception.

At action 1545, accept comments from the human localization expert to include in a completed bug report.

At action 1550, generate sanitization correction files using the received key names and edited translatable text for processing by a developer.

The actions described above can be subdivided into more steps or combined into fewer steps to carry out the method described using a different number or arrangement of steps.

Multi-Tenant Integration

Figure 16:
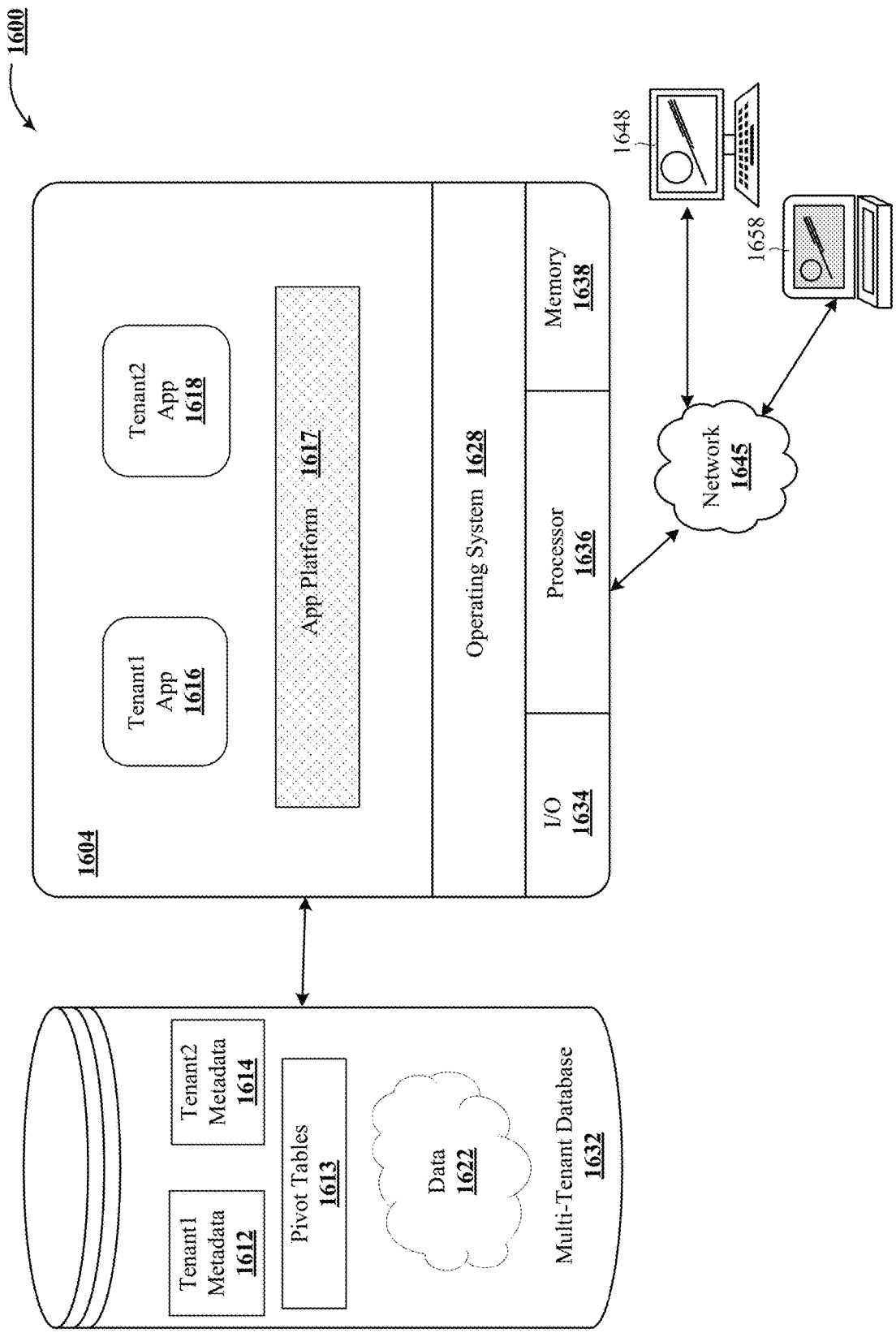
FIG. 16 shows a system environment for implementing a hardware system used to accurately translate elements of a web application.

FIG. 16 presents a block diagram of an exemplary multi-tenant system 1600 suitable for implementing environment 100 of FIG. 1 for accurately and efficiently translating large web applications into multiple languages, via internationalization and localization. In general, the illustrated multi-tenant system 1600 of FIG. 16 includes a server 1604 that dynamically supports virtual applications 1616 and 1618, based upon data 1622 from a common database 1632 that is shared between multiple tenants, alternatively referred to herein as a "multi-tenant database". Data and services generated by the virtual applications 1616 and 1618, including GUI clients, are provided via a network 1645 to any number of client devices 1648 or 1658, as desired.

As used herein, a "tenant" or an "organization" refers to a group of one or more users that shares access to a common subset of the data within the multi-tenant database 1632. In this regard, each tenant includes one or more users associated with, assigned to, or otherwise belonging to that respective tenant. Stated another way, each respective user within the multi-tenant system 1600 is associated with, assigned to, or otherwise belongs to a particular tenant of the plurality of tenants supported by the multi-tenant system 1600. Tenants may represent users, user departments, work or legal organizations, and/or any other entities that maintain data for particular sets of users within the multi-tenant system 1600. Although multiple tenants may share access to the server 1604 and the database 1632, the particular data and services provided from the server 1604 to each tenant can be securely isolated from those provided to other tenants. The multi-tenant architecture therefore allows different sets of users to share functionality and hardware resources without necessarily sharing any of the data 1622 belonging to or otherwise associated with other tenants.

The multi-tenant database 1632 is any sort of repository or other data storage system capable of storing and managing the data 1622 associated with any number of tenants. The database 1632 may be implemented using any type of conventional database server hardware. In various implementations, the database 1632 shares processing hardware with the server 1604. In other implementations, the database 1632 is implemented using separate physical and/or virtual database server hardware that communicates with the server 1604 to perform the various functions described herein. The multi-tenant database 1632 may alternatively be referred to herein as an on-demand database, in that the multi-tenant database 1632 provides (or is available to provide) data at run-time to on-demand virtual applications 1616 or 1618 generated by the application platform 1617, with tenant1 metadata 1612 and tenant2 metadata 1614 securely isolated.

In practice, the data 1622 may be organized and formatted in any manner to support the application platform 1622. In various implementations, conventional data relationships are established using any number of pivot tables 1613 that establish indexing, uniqueness, relationships between entities, and/or other aspects of conventional database organization as desired.

The server 1604 is implemented using one or more actual and/or virtual computing systems that collectively provide the dynamic application platform 1617 for generating the virtual applications. For example, the server 1604 may be implemented using a cluster of actual and/or virtual servers operating in conjunction with each other, typically in association with conventional network communications, cluster management, load balancing and other features as appropriate. The server 1604 operates with any sort of conventional processing hardware such as a processor 1636, memory 1638, input/output features 1634 and the like. The input/output 1634 generally represent the interface(s) to networks (e.g., to the network 1645, or any other local area, wide area or other network), mass storage, display devices, data entry devices and/or the like. User interface input devices 1634 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 1617.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 1636 to the user or to another machine or computer system.

The processor 1636 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1638 represents any non-transitory short or long term storage or other computer-readable media capable of storing programming instructions for execution on the processor 1636, including any sort of random access memory (RAM), read only memory (ROM), flash memory, magnetic or optical mass storage, and/or the like. The computer-executable programming instructions, when read and executed by the server 1604 and/or processor 1636, cause the server 1604 and/or processor 1636 to create, generate, or otherwise facilitate the application platform 1617 and/or virtual applications 1616 and 1618, and perform one or more additional tasks, operations, functions, and/or processes described herein. It should be noted that the memory 1638 represents one suitable implementation of such computer-readable media, and alternatively or additionally, the server 1604 could receive and cooperate with external computer-readable media that is realized as a portable or mobile component or application platform, e.g., a portable hard drive, a USB flash drive, an optical disc, or the like.

The application platform 1617 is any sort of software application or other data processing engine that generates the virtual applications 1616 and 1618 that provide data and/or services to the client devices 1648 and 1658. In a typical implementation, the application platform 1617 gains access to processing resources, communications interfaces and other features of the processing hardware using any sort of conventional or proprietary operating system 1628. The virtual applications 1616 and 1618 are typically generated at run-time in response to input received from the client devices 1648 and 1658.

With continued reference to FIG. 16, the data and services provided by the server 1604 can be retrieved using any sort of personal computer, mobile telephone, tablet or other network-enabled client device 1648 or 1658 on the network 1645. In an exemplary implementation, the client device 1648 or 1658 includes a display device, such as a monitor, screen, or another conventional electronic display capable of graphically presenting data and/or information retrieved from the multi-tenant database 1632.

In some implementations, network(s) 1645 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

Some particular implementations and features are described in the following discussion.

One implementation of a disclosed computer-assisted debugging method includes using a translation debugger running on a processor for comparing a source language file and a translated language file of string properties and other elements of a user interface. The disclosed method also includes generating in a what-you-see-is-what-you-get (abbreviated WYSIWYG) panel of the user interface, visual coding of the string properties and the other elements, wherein the visual coding distinguishes among characteristics relating to translation states. The method further includes accepting on-the-fly edits to string properties in a string property edit panel. The method additionally includes displaying modified string properties in the WYSIWYG panel and exporting an ad hoc changes list of modified string properties produced by the on-the-fly edits.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Some implementations of the disclosed method also include visual coding of string properties modified during prior debugging sessions and visual coding of string properties added or modified by on-the-fly edits during debugging. Characteristics relating to translation states that are visually coded include (a) translated string properties, (b) string properties intended to be but not translated and (c) other elements not intended to be translated, in one implementation of the disclosed computer-assisted debugging method.

One implementation of the disclosed method further includes causing display of the string property edit panel that accepts translated text corrections. For some implementations of the disclosed method, exporting the changes list of modified string properties includes saving the changes list in a format importable by a computer assisted translation tool.

Yet another implementation may include a disclosed localization debugging tool for websites, including code running on a processor that implements a translation debugger configurable to compare a source language file and a translated language file of string properties and other elements of a user interface. The disclosed tool generates in a WYSIWYG panel of the user interface, visual coding of the string properties and the other elements, wherein the visual coding distinguishes among characteristics relating to translation states. The disclosed tool also accepts on-the-fly edits to string properties in a string property edit panel, displays modified string properties in the WYSIWYG panel; and exports an ad hoc changes list of modified string properties produced by the on-the-fly edits. The disclosed localization debugging tool can further include visual coding of string properties modified during prior debugging sessions and of string properties added or modified by on-the-fly edits during debugging. The characteristics relating to translation states that are visually coded include (a) translated string properties, (b) string properties intended to be but not translated and (c) other elements not intended to be translated.

One implementation of the disclosed localization debugging tool further includes causing display of the string property edit panel that accepts translated text corrections. In some implementations, exporting the changes list of modified string properties includes saving the changes list in a format importable by a computer assisted translation tool.

Yet another implementation includes a disclosed non-transitory computer readable media, including program instructions loaded onto the media that, when combined with computer hardware and executed, implements a localization debugging tool for websites configurable to compare a source language file and a translated language file of string properties and other elements of a user interface. The implemented tool also generates in a WYSIWYG panel of the user interface, visual coding of the string properties and the other elements, wherein the visual coding distinguishes among characteristics relating to translation states. The implemented tool further accepts on-the-fly edits to string properties in a string property edit panel, displays modified string properties in the WYSIWYG panel, and exports an ad hoc changes list of modified string properties produced by the on-the-fly edits. Some implementations further include visual coding of string properties modified during prior debugging sessions and visual coding of string properties added or modified by on-the-fly edits during debugging. Characteristics relating to translation states that are visually coded include (a) translated string properties, (b) string properties intended to be but not translated and (c) other elements not intended to be translated. Some implementations further include causing display of the string property edit panel that accepts translated text corrections, and can include exporting the changes list of modified string properties including saving the changes list in a format importable by a computer assisted translation tool.

One implementation of a disclosed method for implementing a sanitization and exception generation tool set configurable for presenting tags of text for translation, extracted from a code base of a web application, in a preliminary localization kit, for sanitization and exception generation by a human localization expert includes running a tag name convention enforcement tool against the preliminary localization kit, to parse the tags to extract key name strings and translatable text, and then validating the extracted key name strings using key naming rules that require presence of at least one keyword from a list of valid keywords and that require key uniqueness. The method also includes creating at least one bug report stub for completion by the human localization expert, including in the bug report stub, context from a tag exception generated using the key naming rules to validate the key name strings and accepting additional comments from the human localization expert to add to the bug report stub, regarding the key name that triggered the exception. The method further includes accepting edits to the translatable text from the human localization expert; and generating a sanitization correction file using the key names received and edited translatable text, for a developer to merge into the code base of the web application.

For the disclosed method, key uniqueness is satisfied when all tags having a particular key name share matching translatable text, and the valid keywords consistently match a part of speech within a natural language. In one case, the valid keywords consistently match elements of the user interface that require a specific grammar when translated into another natural language. The valid keywords provide GUI element context that matches where translatable text was extracted from. The key names for GUI element context invoke, for each target language of the translation, a style guide that specifies a grammatical form in a target natural language into which the translatable text is to be translated. The key names also include context of a module name and a GUI element from which the translatable text was extracted. The context helps in locating the sting in the GUI, especially in large web applications with thousands of panels.

Some implementations of the disclosed method further include implementing a post-merge sanitization check tool configurable for comparing kit versions using the preliminary localization kit and a post-merge sanitized localization kit, extracted from the code base after a merge by a developer, wherein the post-merge sanitization check tool runs a change confirmation tool that compares a selected preliminary localization kit with the sanitized localization kit counting, comparing and reporting total numbers of files in the preliminary localization kit and the sanitized localization kit; comparing and reporting differences in key content between corresponding files in the preliminary localization kit and the post-merge sanitized localization kit; comparing and reporting differences in parameters-in-values between corresponding files in the preliminary localization kit and the sanitized localization kit; and following approval of the post-merge sanitized localization kit, generating a final localization kit to send to a translator.

Some implementations of the disclosed method include, in each of the preliminary localization kit and the post-merge sanitized localization kit, as separate folders: a full folder of a full set of extractions from the code base; a changed folder of extractions of tags that changed after a prior extraction from the code base; and a new folder of extractions of tags that were not present in the code base when the prior extraction took place. In some cases the post-merge sanitization check tool is further configurable to iteratively report exceptions from the counting and comparing for correction and then to repeat the counting and comparing against an updated sanitized localization kit.

One disclosed method of verifying correctness of files used in translation of a code base of a web application includes a translation verification tool set configurable for forwarding a final localization kit to a human translator that includes tags, extracted from a code base of a web application, that have at least a key name and a translatable text string in a source language; and receiving a translated kit from the human translator that includes the extracted tags that have an added or replaced translated text string and present the translated kit to a human localization expert. In one case, the extracted tags each have a text string replaced with the translation. The method also includes running a change confirmation tool that compares the translated kit with the final localization kit—counting, comparing and reporting total numbers of files in the translated kit with the final localization kit; comparing and reporting differences in key content between corresponding files in the translated kit with the final localization kit; and comparing and reporting differences in parameters-in-values between corresponding files in the translated kit with the final localization kit. The method further includes accepting edits to the translatable text from the human localization expert; and committing a final translated kit to persistent storage Some disclosed implementations of the method further include implementing a post-merge sanitization check tool configurable for comparing kit versions using the preliminary localization kit and a post-merge sanitized localization kit, extracted from the code base after a merge by a developer, wherein the post-merge sanitization check tool runs a change confirmation tool that compares a selected preliminary localization kit with the sanitized localization kit. The method also includes counting, comparing and reporting total numbers of files in the preliminary localization kit and the sanitized localization kit; comparing and reporting differences in key content between corresponding files in the preliminary localization kit and the post-merge sanitized localization kit; comparing and reporting differences in parameters-in-values between corresponding files in the preliminary localization kit and the sanitized localization kit; and following approval of the post-merge sanitized localization kit, generating a final localization kit to send to a translator.

One implementation of a disclosed method that supports debugging of a language pack that holds translations of text, which was extracted in source language tags from web app panels, the translations proceeding from a source language into multiple target languages, and translated target language tags logically or physically merged back into the web app panels from which they were extracted, the verification-in-context tool includes code running on a processor that implements a verification-in-context tool configurable for auditing web app panels to verify translation into a selected target language by identifying text, on a web app panel, which renders in the web app panel, determining whether each identified text was contained in a source language tag that was extractable for translation, determining whether processing of each source language tag produced a target language tag that was merged, logically or physically, back into the web app panel after translation, and providing access, linking instances of identified text that were merged back into the web app panel after translation, and supplemental source tag information that was present in respective source language tags before translation. The disclosed method also includes causing display of web app panels in the selected target language, each web app panel encoded to visually indicate, when viewed, which identified text on the web app panel was not extracted, which extracted text was not translated, and which extracted text was merged back into the web app panel after translation; causing display of the supplemental source tag information for a particular identified text on the web app panel, which supplemental source tag information includes at least a bundle to which the source language tag belongs, a key name assigned to the source language tag, and translatable text in the source language. In some implementations, display includes the languages for which a translation exists.

For some disclosed implementations, the method further includes, after causing display of the supplemental source tag information on the web app panel, receiving a translated text correction from a user; and persisting the translated text correction for use in the web app panel, in the selected target language. The method can further include causing display of a correction entry area that accepts the translated text correction. For the disclosed method, persisting the translated text correction includes saving the translated text correction in a format importable by a computer assisted translation tool. Persisting the translated text correction can also include updating the identified text in the translated target language tag used by the web app panel and persisting the updated translated target language tag. Some implementations of the method further include causing display of the supplemental source tag information in a floating window, that overlays the web app panel, without changing the web app panel. The disclosed method further includes causing display of the supplemental source tag information in an area set aside for the supplemental source tag information. For some disclosed implementations of the method, each web app panel is further encoded to visually indicate a natural language string in the source language that appears in identified text, alongside a string in the target language, after translation of portions of the identified text. The method can further include iterating over changes to the web app panels, for the selected language, and generating web application context renderings for human visual inspection to verify that translated characters in translated text strings do not break the web app panels. In some cases, the method further includes iterating over changes to the web app panels, for the selected language, and generating web application context renderings for machine inspection to verify that translated characters in translated text strings do not break the web app panels.

In one implementation, a disclosed verification-in-context tool implements a regression tool set configurable to iterate over changes to the web app panels, for the selected language, and generate web application context renderings for human visual inspection to verify that translated characters in translated text strings do not break the web app panels. In some cases, the regression tool set is configurable to iterate over changes to the web app panels, for the selected language, and generate web application context renderings for machine inspection to verify that translated characters in translated text strings do not break the web app panels.

Yet another implementation may include a non-transitory computer readable media, including program instructions loaded onto the media that, when combined with computer hardware, implement debugging of a language pack that holds translations of text, which was extracted in source language tags from web app panels, the translations proceeding from a source language into multiple target languages, and translated target language tags logically or physically merged back into the web app panels from which they were extracted.

Yet another implementation may include a tangible non-transitory computer readable storage media including computer program instructions that, when combined with computer hardware and executed, cause a computer to implement any of the methods described earlier.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A computer-assisted debugging method, comprising:
comparing, by one or more processors, a source language file having a first string property, and a translated language file having a second string property, to identify characteristics relating to translation states, the characteristics comprise translated string properties, string properties intended to be translated but that are not yet translated, and other elements not intended to be translated, and wherein the translated language file is a translated version of the source language file;
generating, by the one or more processors, visual coding of the second string property in a user interface panel, wherein the visual coding enables a user to differentiate among the characteristics relating to the translation states;
modifying, by the one or more processors, in response to an input by the user received through the user interface panel, the second string property to create a modified string property;
displaying, by the one or more processors, the modified string property in the user interface panel; and
exporting, by the one or more processors, the modified string property to a file that includes the translated language file.

2. The method of claim 1, further comprising:
generating, by the one or more processors, visual coding of an additional string property modified during a prior debugging session.

3. The method of claim 1, further comprising:
generating, by the one or more processors, visual coding of an additional string property added or modified by edits during a current debugging session.

4. The method of claim 1, further comprising:
displaying, by the one or more processors, the user interface panel to receive the input, wherein the input comprises a translated text correction.

5. The method of claim 1, wherein the file is in a format importable by a computer assisted translation tool.

6. A computer-assisted debugging system, comprising:
a memory; and
one or more processors configured to perform operations stored in the memory, the operations comprising:
comparing a source language file having a first string property, and a translated language file having a second string property, to identify characteristics relating to translation states, the characteristics comprise translated string properties, string properties intended to be translated but that are not yet translated, and other elements not intended to be translated, and wherein the translated language file is a translated version of the source language file;
generating visual coding of the second string property in a user interface panel, wherein the visual coding enables a user to differentiate among the characteristics relating to the translation states;
modifying, in response to an input by the user received through the user interface panel, the second string property to create a modified string property;
displaying the modified string property in the user interface panel; and
exporting the modified string property to a file that includes the translated language file.

7. The computer-assisted debugging system of claim 6, the operations further comprising:
generating visual coding of an additional string property modified during a prior debugging session.

8. The computer-assisted debugging system of claim 6, the operations further comprising:
generating visual coding of an additional string property added or modified by edits during a current debugging session.

9. The computer-assisted debugging system of claim 6, the operations further comprising:
displaying the user interface panel to receive the input, wherein the input comprises a translated text correction.

10. The computer-assisted debugging system of claim 6, wherein the file is in a format importable by a computer assisted translation tool.

11. A non-transitory computer readable medium, including program instructions loaded thereon that, when combined with computer hardware and executed, implements a debugging tool configured to perform operations comprising:
comparing a source language file having a first string property, and a translated language file having a second string property, to identify characteristics relating to translation states, the characteristics comprise translated string properties, string properties intended to be translated but that are not yet translated, and other elements not intended to be translated, and wherein the translated language file is a translated version of the source language file;
generating visual coding of the second string property in a user interface panel, wherein the visual coding enables a user to differentiate among the characteristics relating to the translation states;
modifying, in response to an input by the user received through the user interface panel, the second string property to create a modified string property;
displaying the modified string property in the user interface panel; and
exporting the modified string property to a file that includes the translated language file.

12. The non-transitory computer readable medium of claim 11, the operations further comprising:
generating visual coding of an additional string property modified during a prior debugging session.

13. The non-transitory computer readable medium of claim 11, the operations further comprising:
generating visual coding of an additional string property added or modified by edits during a current debugging session.

14. The non-transitory computer readable medium of claim 11, the operations further comprising:
displaying the user interface panel to receive the input, wherein the input comprises a translated text correction.

15. The non-transitory computer readable media medium of claim 11, wherein the file is in a format importable by a computer assisted translation tool.

* * * * *